Oct. 6, 1936. F. M. CARROLL ET AL 2,056,389
TABULATING MACHINE
Filed Feb. 28, 1931 10 Sheets-Sheet 1

Inventor
Fred M. Carroll
Arthur F. Smith
By their Attorney
W. M. Wilson

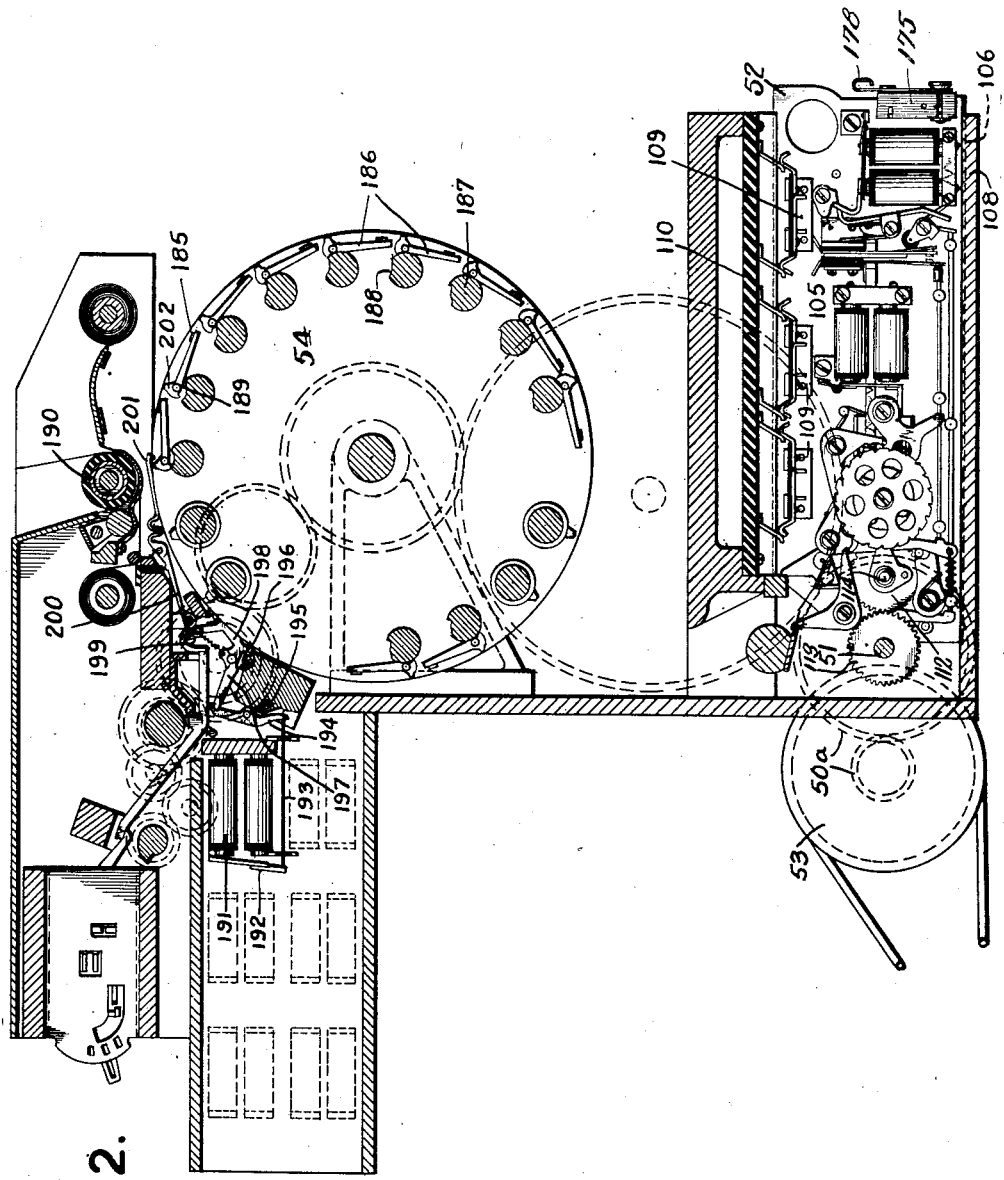

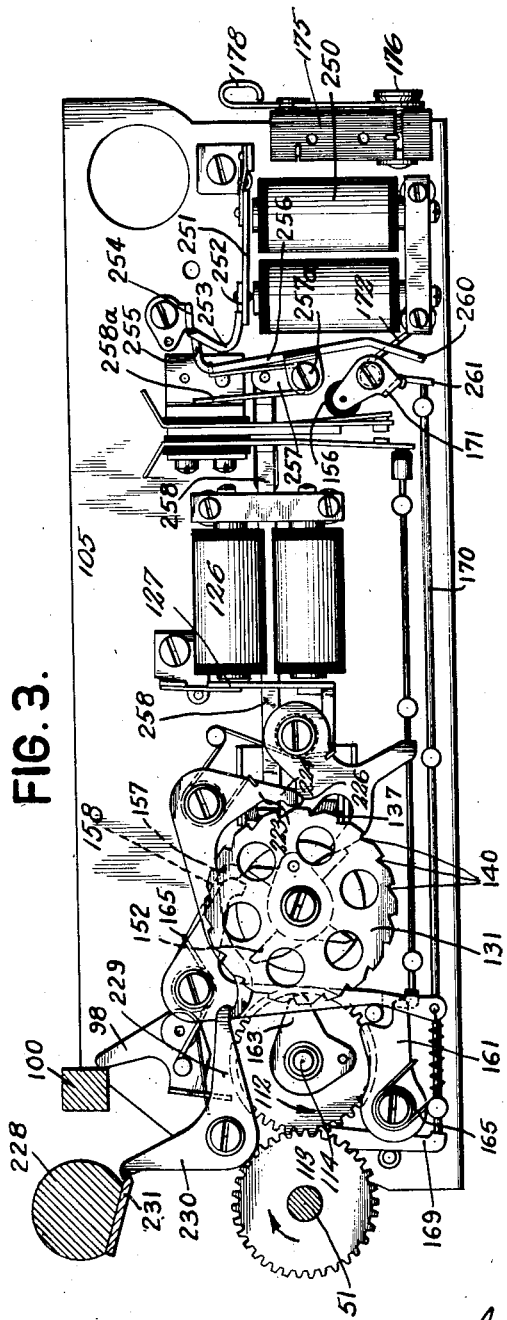

Oct. 6, 1936.  F. M. CARROLL ET AL  2,056,389
TABULATING MACHINE
Filed Feb. 28, 1931   10 Sheets-Sheet 4

Oct. 6, 1936.  F. M. CARROLL ET AL  2,056,389
TABULATING MACHINE
Filed Feb. 28, 1931  10 Sheets-Sheet 5

Oct. 6, 1936.  F. M. CARROLL ET AL  2,056,389
TABULATING MACHINE
Filed Feb. 28, 1931   10 Sheets-Sheet 7
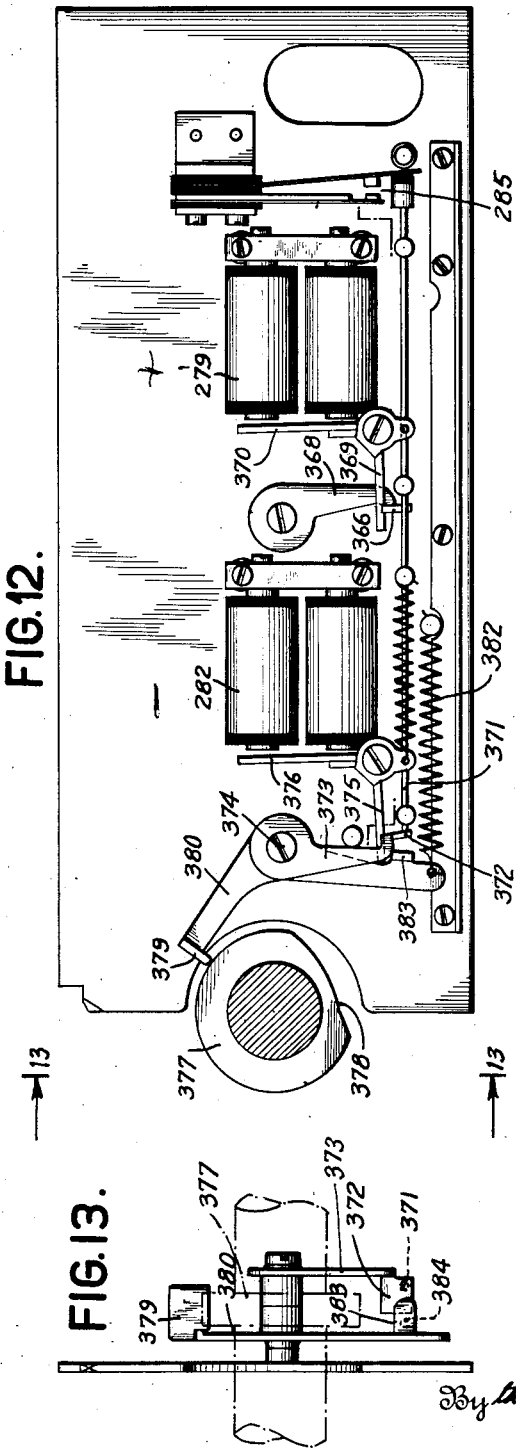
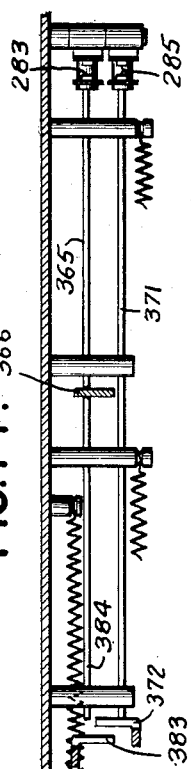
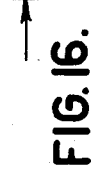

Oct. 6, 1936. F. M. CARROLL ET AL 2,056,389
TABULATING MACHINE
Filed Feb. 28, 1931   10 Sheets-Sheet 8

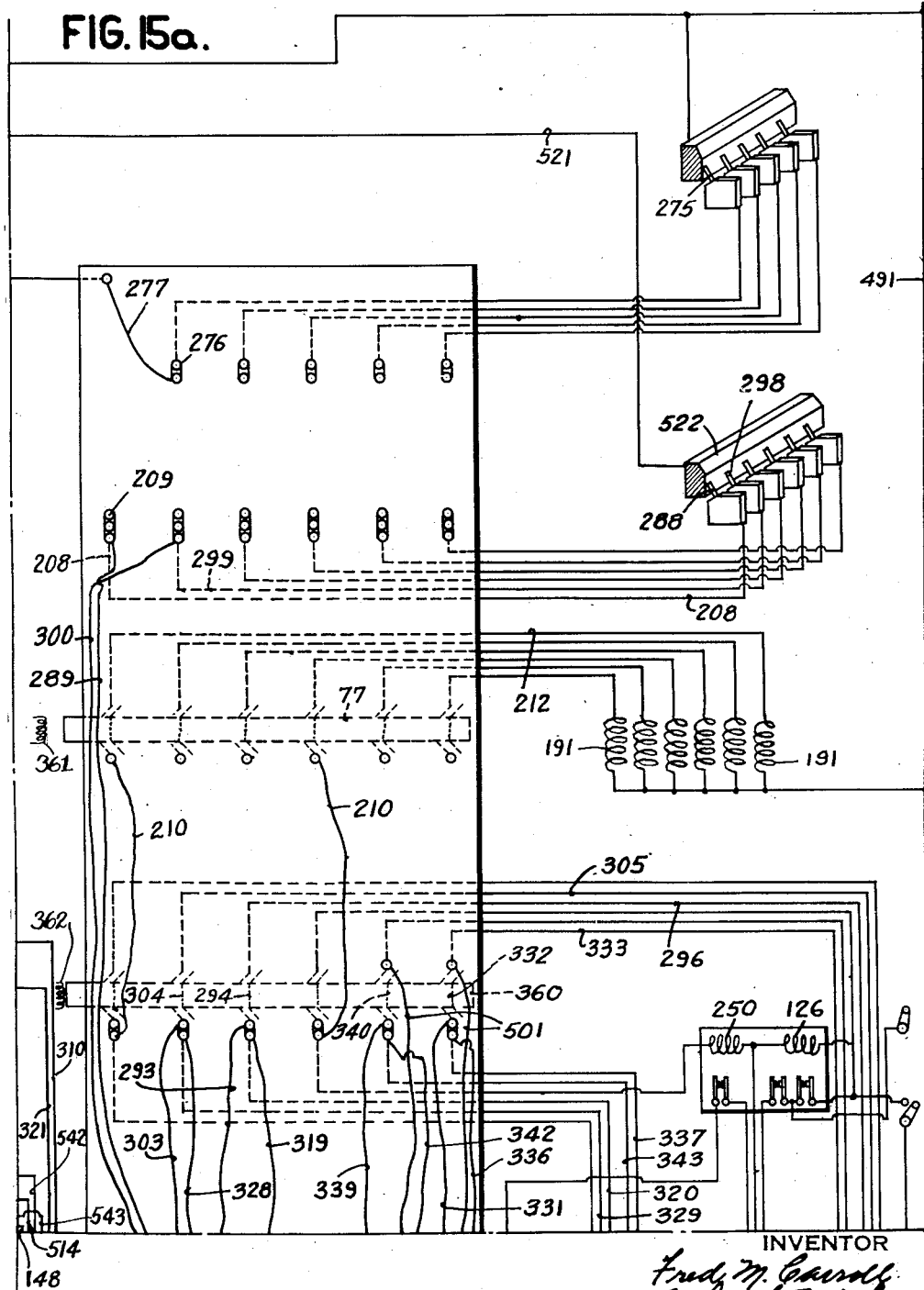

Patented Oct. 6, 1936

2,056,389

UNITED STATES PATENT OFFICE 2,056,389

TABULATING MACHINE

Fred M. Carroll, Yonkers, and Arthur F. Smith, Brooklyn, N. Y., assignors, by mesne assignments, to International Business Machines Corporation, New York, N. Y., a corporation of New York Application February 28, 1931, Serial No. 519,003

12 Claims. (Cl. 235—92)

This invention concerns accounting machines and more particularly such machines on which items may be subtracted as well as added.

While not limited to such an application the invention has been found to be particularly useful in machines of the printing tabulator type such as that shown in the Carroll Patent 1,750,459 and it will be described in connection with such a machine for illustrative purposes only.

Printing tabulators are controlled in their adding and printing functions by perforated record cards on which data are designated by differential locations of perforations in the cards. The record cards are divided into columns and, in the case of numerical data, each column may be properly punched to represent any figure and a plurality of columns may be chosen for recording items consisting of a plurality of denominational orders. Also different groups of columns may be selected for the recording of different classifications of data. For example, in the embodiment shown a certain group of columns or a card field may ordinarily be punched with perforations to represent a debit item and by another special, but differently located perforation, the perforations in the same card field may represent a credit item. The cards are successively and automatically fed through the machine and in passing through it are analyzed and the data represented by their perforations or index points are automatically entered into accumulator units and entered either additively or subtractively.

The printing section of the machine is likewise automatically controlled and may either list each item as the successive record cards are analyzed, or print the balance of a plurality of items which have additively and subtractively been entered into the accumulator units.

The machine described in the above mentioned patent is a tabulator of high adding and printing speed in that it makes use of a rotary printer and is of great flexibility of operation in that each adding unit is a self contained operative entity which may be associated at will with any other unit for conjoint operation in tabulating items running into several figures and may be selectively connected with the analyzing mechanism to add the figures designated in any card column. The same flexibility of operation also exists in the printing devices and each of these may likewise be connected to the analyzing mechanism to print items from any card columns independently of any adding unit, or to any adding unit to print a total accumulated thereon. The present invention contemplates retaining all these features in respect to the adding or printing functions of the machine and, in addition, providing a subtracting mechanism in which similar advantages in speed and flexibility of operation reside.

The principal object of the invention is to provide an automatic subtracting mechanism for accounting machines which effects subtraction, preferably by the complemental process, by a new and novel arrangement and operation of its elements.

A further object of the invention is to provide a new arrangement of subtracting mechanism to take care of positive and negative balances.

A still further object of the invention is to provide an adding and a subtracting mechanism which includes a debit balance totalizer or accumulator and a credit balance accumulator or totalizer and arranged to enter the natural or direct number in the selected totalizer and the tens complement of the natural or direct number in the other totalizer without the use of the usual translator.

A still further object of the invention is to provide a new and improved arrangement of selecting mechanism whereby the natural or direct numbers and the tens complements of the natural or direct numbers are selectively entered in the appropriate totalizers.

A still further object of the invention consists in the provision of an improved arrangement whereby either a debit or a credit balance may be automatically and selectively printed upon the record sheet.

A still further object of the invention consists in the provision of means for conditioning the machine in order that either a debit or credit balance may be selectively obtained and the balance retained on the totalizers or the totalizers cleared for further entries when a balance has been printed.

Still further and additional objects relating to improved arrangements of operation of construction comprise: the provision of separate adding and subtracting accumulator units which may be interconnected to conform to a predetermined requirement; an improved arrangement of clutch operating device for the accumulating element; a means simpler than heretofore employed for interconnecting the transfer elements; an improved arrangement of switch bars which selectively connect the adding and subtracting units for the accumulating or subtracting function or for obtaining balances thereof, and the relatively important feature of automatically taking care of the fugitive unit in subtracting operations by the complemental process.

These and other objects, which will become apparent as the description proceeds, will be hereinafter explained in connection with the preferred embodiment of the invention.

The principle of operation on which the invention is based consists in entering the natural number in one appropriate balance totalizer and the tens complement thereof into another balance totalizer. The selection of the debit or credit balance totalizer is automatically effected by special designating perforations, the adding entry being effected in the manner of usual tabulating operations. The subtraction is accomplished by the complemental process, the control devices being arranged to commence the entry in the subtracting totalizer at the commencement of the cycle and thereafter terminate it at differential times, such times being when the entry operation in the totalizer receiving the natural number begins. By having the time at which the perforations are sensed the dividing line between the termination of the entry in one totalizer and the beginning of the entry in the other totalizer it will be observed that the nines complement entry will be effected in the totalizer not characterized by the type of entry, debit or credit.

The control devices are automatically switched into operation without attention of the operator to alternately effect the debit and credit entries as the cards are fed.

To take care of the fugitive unit, the control device which initiates the entry operation in the units order is effective a point earlier than for the remaining orders thus providing the entry of the tens complement in this order.

At the termination of entry operations the result will be positive on one balance totalizer and negative on the other. As the printing mechanism embodied in the machine is adapted to print the result standing on the totalizers the machine includes an automatic switching mechanism which selects the balance totalizer which is of interest or positive in result, for a balance printing operation.

The balance result on the totalizer representing the positive amount is read out to control printing mechanism, further provision being provided to secure a balance either as a sub-total or grand-total, the latter including the clearing operation for both balance totalizers.

If the character of the result is known in advance, a single balance totalizer only need be employed for such operations. However, where the items are entered promiscuously and their relative magnitude unknown both a debit and a credit balance totalizer are required, the present machine having provisions for selecting the necessary one to print only the balance which is of interest.

Certain of the features disclosed in the present application are also disclosed and claimed in the copending application of J. W. Bryce, Serial No. 119,803, filed July 1, 1926, now Patent No. 1,950,475, dated March 13, 1934.

The invention is illustrated by way of example in the accompanying drawings in which the same reference numerals designate the same parts throughout the several views, and in which Fig. 1 is a diagrammatic arrangement of the entire machine assembly, the casing and supporting structures being omitted for the sake of clearness.

Fig. 2 is a sectional view through the accumulating and printing mechanism along the line 2—2 of Fig. 1.

Fig. 3 is a view in side elevation of one of the accumulating units.

Fig. 4 is a plan view of the accumulating unit shown in Fig. 3.

Fig. 12 is a view in side elevation of the debit and credit switch bar selecting unit.

Fig. 13 is an end view taken on the line 13—13 of Fig. 12.

Fig. 14 is a plan view partly in section of the contact closing mechanism of the debit and credit switch bar selecting unit.

Figure 15:
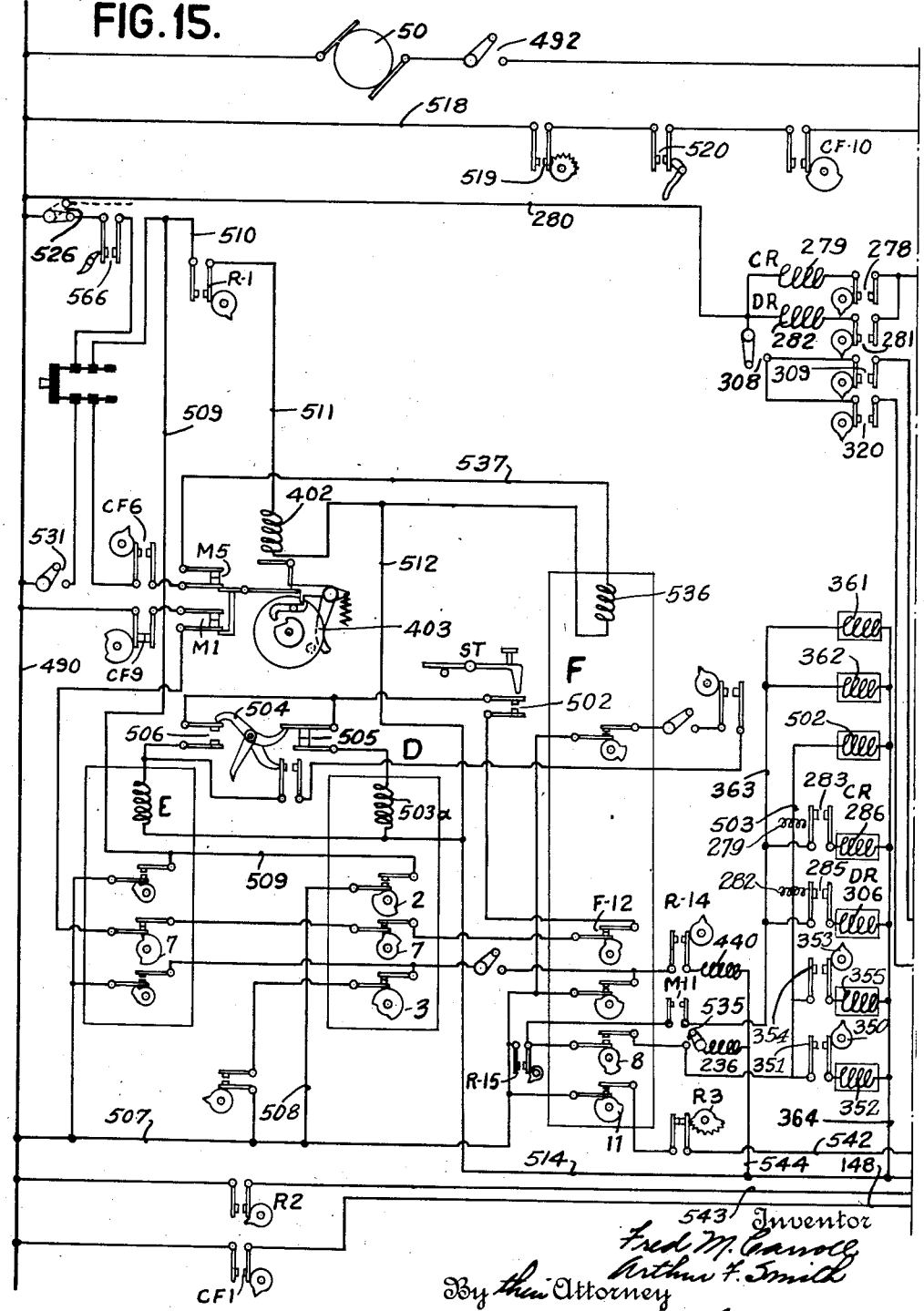
Figure 15B:
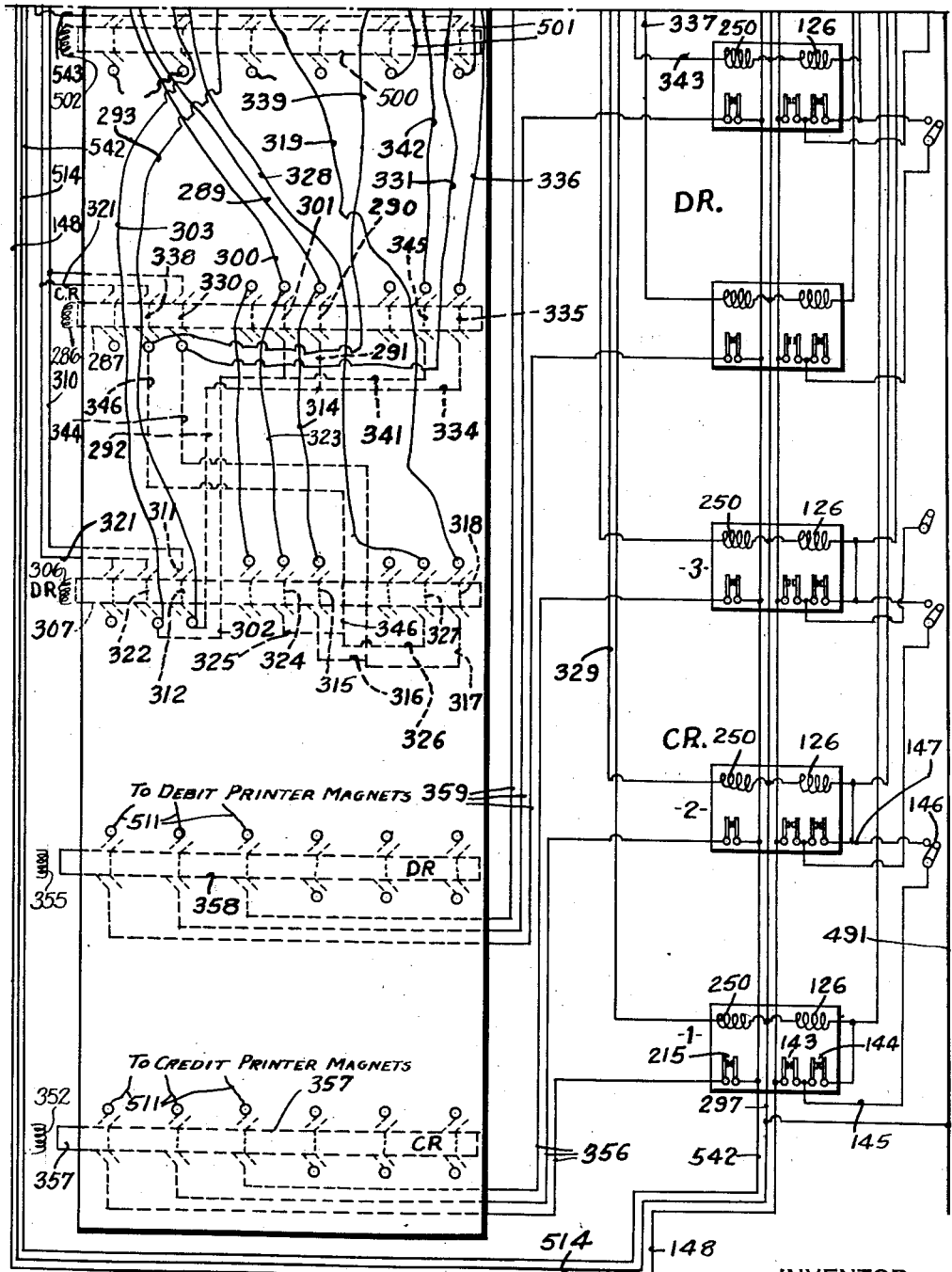

Figs. 15, 15a and 15b taken together show a complete circuit diagram of the machine.

Fig. 16 is an illustrative example of entries effected in the debit and credit balance totalizers or accumulators, the printing of such entries and the desired balance.

Figure 1:
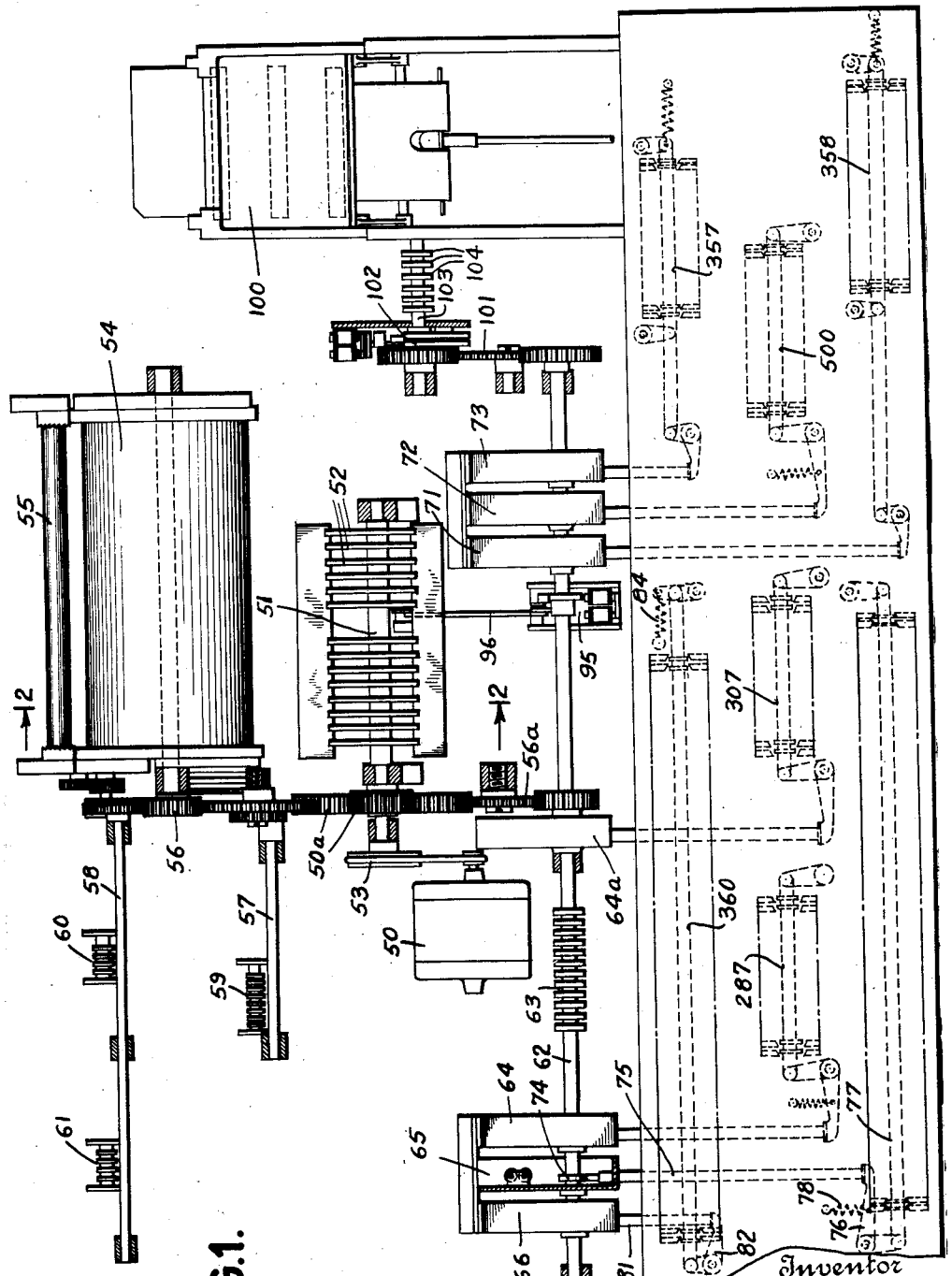

A general idea of the operation of the machine in which the preferred embodiment of the invention is incorporated may be best obtained by reference to Fig. 1 which, although schematic in form, shows the essential elements for a completely operative machine.

The motive power for driving the machine is furnished by an electric motor 50 which drives all the operating shafts through suitable gear trains. The tabulator shaft 51 is operatively connected to the accumulator units 52 and is driven through a gear train 50a and pulley 53 by the motor. The printing drum 54 and platen 55, together with the necessary paper feed mechanism (not shown), are driven through a gear train indicated generally at 56, and an extension of this train operates the shafts 57 and 58 on which are mounted the rotatable parts of the automatic timers indicated at 59, 60 and 61. The motor, through another branch of the gear train 56a, constantly rotates a shaft 62 on which are rigidly fastened the cams of the regular cam contacts 63 and the cams of the switch bar controlling jacks 64, 64a, 65, 66, 71, 72 and 73. The regular cam contacts associated with cams 63 are of the type usually adopted in machines of this type, some being illustrated typically as R contacts in Fig. 15, and consist of spring contacts opened and closed by their associated cams at predetermined points in every machine cycle.

Each of the jacks 64 to 66 and 71 to 73 consists of a cam for depressing a rod during machine operation which, through a suitable bell crank, shifts a switch bar carrying a plurality of control contacts into and out of circuit closing position. The jack 65, which is shown partly in section, has a cam 74 which in the home or D position of the machine depresses a rod 75, rocking a bell crank 76 against the action of its biasing spring 78 and holding the listing switch bar 77 to the left, which is its open circuit position. When the machine is in operation the low portion of the cam 74 permits the rod 75 to rise at the proper times and the spring 78 rocks its bell crank counterclockwise and shifts the bar 77 to the right into closed circuit position.

The bar 77, which is the listing switch bar, is operated in every machine cycle in which there is no totalling, and is permitted to remain in circuit closing position during that portion of the machine cycle in which the analyzing brushes are searching the entire active index point area of the controlling card. During the cycle in which the listing bar is inactive a locking magnet holds the operating rod 75 depressed so that the cam is ineffective.

The remaining jacks are similar to jack 65 in that they have a cam for depressing a rod to shift a switch bar. During the cycles in which they are inactive a locking magnet holds their operating rod depressed so that the cams are ineffective. The jack 66 through its rod 81 and bell crank 82 controls the adding switch bar 360 which is biased to open circuit position by the spring 84. The operation of the debit and credit switch bars 287 and 307 by the jacks 64 and 64a, and that of the debit and credit balance printing switch bars 357 and 358 and a total and reset switch bar 500 by their jacks 73, 71 and 72 respectively is substantially similar to that of the listing switch bar 77. The switch bars and controlling devices are briefly outlined here as they are fully shown and described in the Carroll Patent 1,750,459.

The constantly rotating shaft 62 has also fixed thereon the cam of a shifting mechanism 95 which through a link 96 serves to rock a total print control shaft to select total printing operations with or without reset of the accumulating units.

The card feed mechanism indicated generally at 100 is of the type usually employed in machines of this character and needs no detailed description. It is driven from the shaft 62 through a gear train 101, the last gear of the train being connected to the card feed shaft 103 through a one revolution clutch 102. The card feed cams 104, whose function is to control the opening and closing of control contacts during card feeding cycles, are fixed to the card feed shaft 103.

The mechanical and electrical details of the several new elements of the machine will first be described and then the complete operation of the machine explained in connection with the circuit diagram.

The operation and structural details of the accumulating and subtracting mechanism may be clearly understood from Figs. 2, 3, 4, 5 and 6 of the drawings. This mechanism is divided into self-contained replaceable units designated here as "accumulator units", each corresponding to a single denominational order and each containing its own differential mechanism and a pair of controlling magnets. The view in Fig. 2 shows a complete unit (as at 52 in Fig. 1) inserted in place in the machine frame, the latter being shown in section to give an unobstructed view of the accumulator unit illustrated.

Each unit 52 is mounted on an individual base plate 105 (Fig. 2) adapted to be slid into grooves 106 in the machine frame 108 and held in place by any suitable locking mechanism. The base plate of the unit has a plurality of contact blocks 109 mounted at its upper part carrying contact springs which engage cooperating spring contacts on a contact carrying block 110 permanently mounted in the frame 108. This construction permits placing of the unit in its groove to automatically make the proper electrical connections to the machine circuits. The placing of the unit in the frame also insures proper operative driving connections with the tabulating shaft through mechanism which will now be described.

The tabulating shaft 51, shown in Fig. 1, is constantly rotated by the motor 50 as long as the latter is in operation and is driven by a suitable gear train such as 50a in Fig. 2.

The shaft 51, as stated, is common to a series of accumulator units (Figs. 2, 3 and 5) and through a gear 113 (of which there is one for each unit and secured to shaft 51) drives, through an intermediate gear 112, one element of a clutch element 117 secured to gear 111. The gear 112 is pivoted on a stud 114 secured to the base plate of the accumulator unit and has secured thereto certain cams the function of which will be pointed out hereinafter.

The gear 111 is loosely mounted upon a sleeve 115 carried by a stud secured to the base plate and the central hole 93 (Fig. 6) of the gear 111 is slightly larger than the diameter of the supporting sleeve 115 so that the gear 111 may be turned at an angle, the pivot point being at the intermeshing teeth of gears 111 and 112. At such point of intersection a slot in a bracket 116 secured to the base plate confines the gears so that they constantly intermesh to permit the diametrically opposite end of gear 111 to be rocked so that the clutch teeth of element 117 secured to the constantly rotating gear 111 may be shifted to engage the teeth of a companion clutch element 118 to drive the latter a distance commensurate with that represented by the value of the index point on the card in adding operation, and the nines complement in the case of substracting operations.

Figure 5:
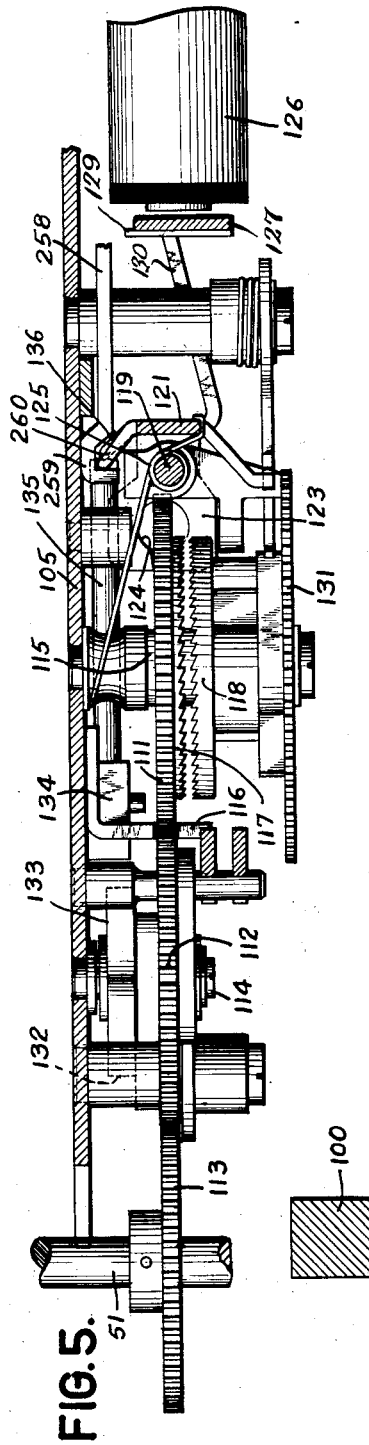
Fig. 5 is an enlarged plan view of the front part of the accumulating unit.
Figure 6:
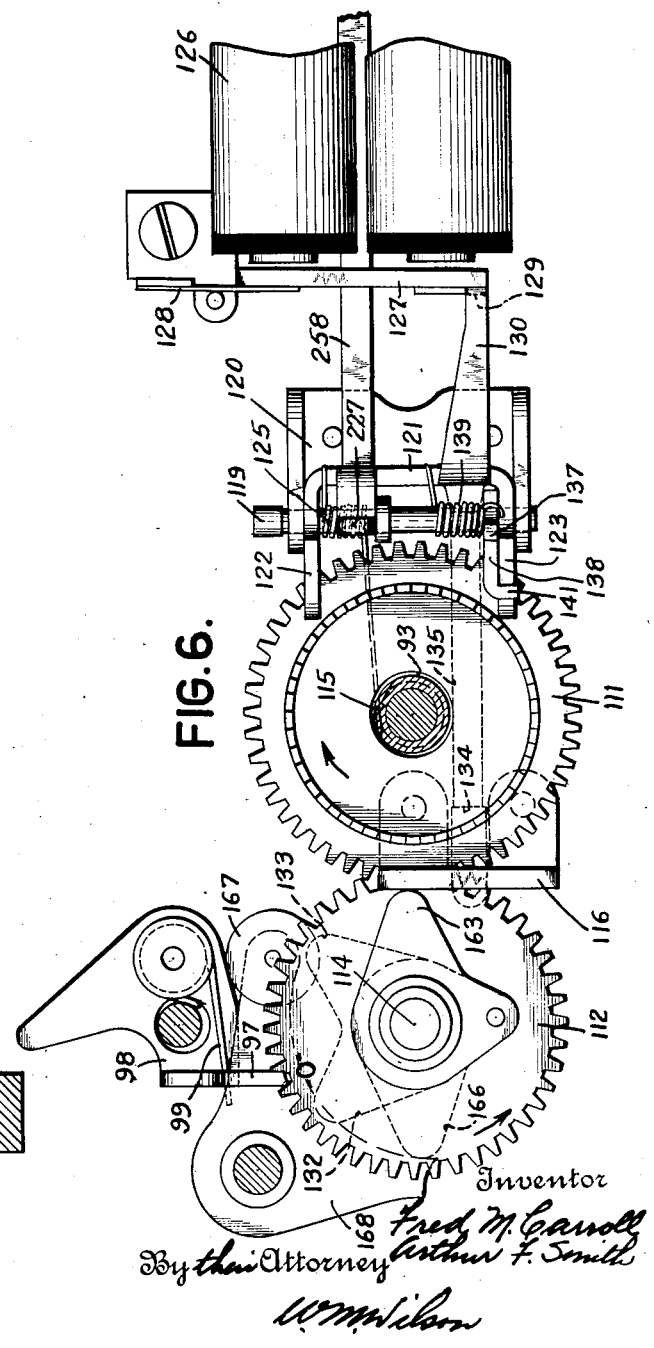
Fig. 6 is a view in side elevation of the parts shown in Fig. 5.
Figure 7:
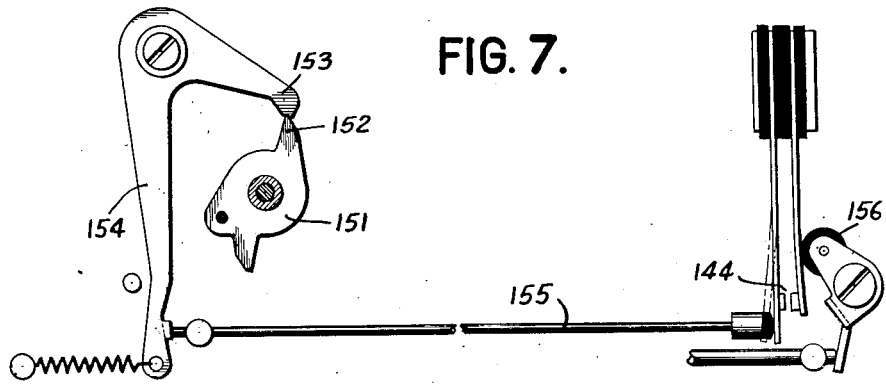
Figs. 7 and 8 are views in side elevation of certain detached parts associated with the transfer mechanism.
Figure 8:
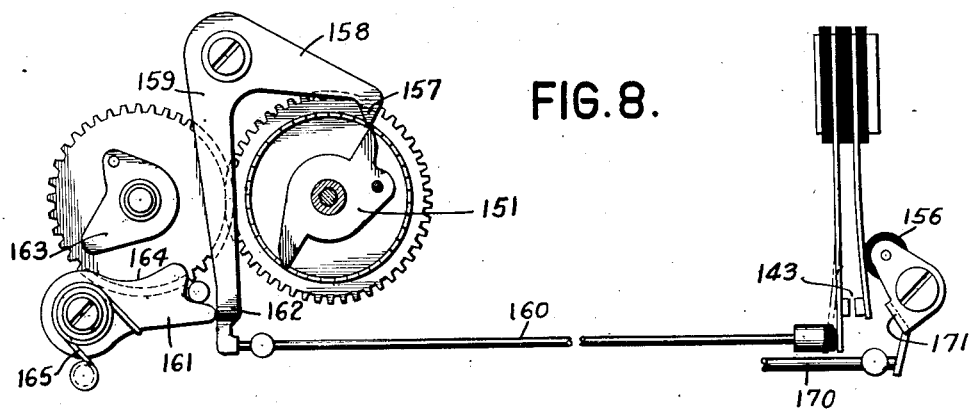

For the purpose of selectively engaging elements 117 and 118 there is provided the following mechanism. A stud shaft 119 is carried by ears of a bracket 120 secured to the plate 105 and mounted on the stud 119 is a yoke-shaped frame comprising a cross piece 121 (Figs. 5 and 6) and two side portions 122 and 123, reference numeral 121 hereafter designating the yoke. Each is apertured as shown in Fig. 5, in the case with side portion 123 to provide a gear receiving slot 124 so that when the yoke is released for movement by a spring 125 (Fig. 5) the spring 125 will turn the yoke counterclockwise to shift gear 111 at an angle and thus engage clutch elements 117 and 118. The engaging teeth are fully engaged at the right side when the clutch is effective (Fig. 5) and the extent of engagement diminishes towards the left, due to the angular disposition of the gear 111, but a sufficient driving engagement is always insured to drive element 118 the required amount.

For effecting a driving connection between clutch elements 117 and 118 at differential times during the adding cycle a control device including an accumulator magnet 126 is provided. When this magnet is energized it attracts an armature 127 carried by a resilient spring blade 128. Integral with the yoke 121 is an extending arm 130 normally latched upon top (Fig. 6) of a block 129 secured to the armature. Upon energization of the magnet and resultant shifting of the armature the arm 130 and the yoke 121 are released permitting the spring 125 to effect the desired clutch connection. When such operation is effected an accumulating element 131 (Figs. 3 and 5) secured to the clutch element 118 is differentially turned in a clockwise direction to accumulate during the adding cycle the value represented by the controlling index point of a card.

The actuation of the accumulating element 131 commences at differential times and is stopped at the termination of the cycle in which case a natural value which is commensurate with that represented by the index point is accumulated by the wheel 131. To effect a disconnection of the clutch elements at the proper time the following device is preferably employed.

Secured to the gear 112 is a double-lobed profile cam, each lobe 132 and 133 of which is adapted to strike a guided block 134 secured to a rod 135 the extremity of which engages an extension 136 (Fig. 5) integral with the yoke 121. The cam 132, 133 has a timed relation with the card feeding mechanism in order that the cam lobe 132 restores the yoke 121, to a position where the arm 130 is relatched by the armature at the termination of the adding cycle. After the entry operation the clutch device may again be rendered effective to effect a transfer. At the termination of such operation the lobe 133 striking the block 134 will again effect the required disconnection of the clutch elements.

The accumulating element or wheel 131 is normally locked by a lug or an extension 137 (Fig. 3) of a plate 138 (Fig. 6) which is mounted on stud 119 and urged by a spring 139 so that lug 137 normally engages one of the interdental spaces 140 of the wheel 131. When the clutch connection is effected a transverse lug 141 of plate 138 overlying the side portion 123 of the yoke causes the plate 138 to be shifted as the yoke 121 is shifted so that the lug 137 is positioned to release the wheel 131 for operation. When the clutch connection is ineffective the lug 137 again locks the wheel in its position of adjustment.

The machine parts move synchronously with the feed of the record cards past the analyzing brushes; thus, shaft 51 rotates the gear 111 at such a speed that the latter moves a distance equal to the width of a tooth space while the analyzing brushes are covering a distance equal to the spacing between the centers of adjacent index points. The clutch engages when or shortly after a perforation is engaged by an analyzing brush and the lobe 132 (Fig. 6) is so positioned as to disengage the clutch as the analyzing brush is passing the zero index position of the card. The wheel 131, then, rotates through a number of tooth spaces equal to the numeral representation of the perforation in the card. Thus if there is a perforation in the six index point position the clutch will engage when the analyzing brush encounters the six index point and will be disengaged, after moving the wheel 131 through six tooth spaces. When the brush encounters a perforation at the zero index position the magnet 126 will be energized and the clutch element 117 shifted. The lobe 132, however, will immediately shift it back to normal position before the clutch teeth have a chance to actively engage. Thus, there will be no movement of the accumulating element in response to a perforation in the zero position.

During tabulating operations the movements of the accumulating element are cumulative for successive cards and at the end of a group of cards the position of the accumulating element will correspond to the sum of the numerals represented on the different cards, and in other words the position of an accumulating element may represent a single item or the sum of a plurality of items.

It may be noted that the clutch teeth 117 and 118 are shaped so that extreme accuracy of adjustment of the clutch elements is unnecessary. Each tooth consists of a surface normal to the face of the member on which it is formed joined by a sloping surface. The clutch members are not actively engaged until the normal surfaces of opposing teeth are in contact and the energization of the control magnet may be timed almost a full tooth space or index point ahead of the time of active engagement of the clutch members.

It is essential that the starting position of the various elements be preserved until an accumulator unit 52 is fully inserted in the machine. Certain of the elements such as restoring cams, etc. have definite starting points and are established by the registration of a "0" mark on the gear 112 (Fig. 6) with a lug 97 of a double arm 98 pivoted on plate 105. A spring 99 retains the gear 112 and associated driving train in locked position but when the unit is inserted in the machine the coaction of a fixed bar 100 with a tail of the arm shifts the arm 98 and retains it in such position that the driving elements may be freely rotated. Withdrawal of the unit permits spring 99 to be effective to shift arm 98 and lock the gear 112, retaining the initial starting position of the driving elements.

*Transfer mechanism*

This machine, as mentioned above, operates at high speed for printing as well as tabulating and the usual mechanical transfer mechanisms are not suited to this type of operation. The electrical transfer system described in the U. S. patent to Lake 1,372,965 has therefore been applied to the machine, as will now be described, and has been found to be extremely appropriate to the high speed service required.

Transferring is required whenever an accumulating element or wheel, in accumulating successive items, passes through zero, as in this case it is necessary to enter one unit in the accumulating element of the next higher denominational order. The necessity for this operation may arise under two different sets of conditions; first, when the accumulating element into which the carried unit is entered stands in any except the nine position and second, when this accumulating element stands in the nine position. In the first case the entry of the unit in the accumulating element of the next higher order ends the transfer. If this accumulating element stands in the nine position, however, the entry of the carried unit will in itself cause it to move to zero position and it is then necessary to enter a unit in the accumulating element of the next higher order. The latter case involves at least three accumulating elements in the transfer operation. In the electrical transfer system the extra unit, which is carried from one accumulating element to the next, is not entered as soon as the element of the lower order passes through zero, but all transferring operations necessitated during a machine cycle are carried out simultaneously on all elements involved during the latter part of the cycle after the analyzing brushes have cleared the active index point area of the controlling card. Each accumulating element which passes through zero during a cycle prepares an electric circuit to the accumulator magnet of the accumulating element of the next higher order and any accumulating element which stands in the nine position at the end of the accumulating portion of the cycle prepares an additional circuit to the accumulator magnet of the accumulating element next higher in order to itself. This latter circuit, however, can only be energized through the transfer circuit of the accumulating element next lower in order to the accumulating element which stands in the nine position. It will therefore not be energized in the absence of a carrying operation to the accumulating element which stands in the nine position.

The prepared circuits are energized with a single pulse of current during the latter portion of the cycle, energizing the proper accumulator control magnets and causing the simultaneous carrying of a unit to all the accumulating elements involved in this phase of the transfer operation.

The electrical transfer circuit arrangement may be understood from Fig. 15b in which is illustrated, by way of example, three accumulator units comprising the credit balance accumulator and the connections whereby they are arranged for transferring from the lower order (unit 1) to the serially adjacent higher orders (units 2 and 3). Each accumulator unit is provided with a controlling magnet and two pairs of transfer contacts, the controlling magnets being designated by 126 and the transfer contacts of a unit, 143 and 144, respectively. Mechanism which will be described later causes contacts 143 to be set for closure when the accumulating element passes through zero and the closure is actually effected at the latter part of the cycle. Contacts 144 are set for closure if the accumulating element comes to rest in the "9" position at the end of the entry operation and closed at transfer time. The corresponding contacts of units 2 and 3 will be closed under like circumstances in connection with these units. The contacts 143 of unit 1 are connected by a wire 145 and a unit interconnecting switch 146 and thence by wire 147 to the magnet 126 of unit 2. Similar connections are provided between units 2 and 3, et seq. Closure of contacts 143 of each unit will extend the circuit of the magnet 126 of the next higher order to a common energizing line 148 over which a single impulse of current is sent under control of a cam contact CF1 (Fig. 15) during that portion of the cycle in which closure of contacts 143 and 144 are maintained.

It may be assumed, by way of example that during a certain cycle the accumulating element of unit 1 passes through zero, making it necessary to carry one unit to unit 2, and, incidentally closing contacts 143 of unit 1, and the accumulating element of unit 2 stands at nine making it necessary to carry one unit to unit 3 in the transferring operation and incidentally closing the contacts 144 of unit 2.

When the cam contacts CF1 close, a circuit will be momentarily completed through the magnet 126 of unit 2 across contacts 143 of unit 1 thus carrying the extra unit to unit 2 and the magnet 126 of unit 3 will be momentarily energized through the contacts 143 of unit 1 and contacts 144 of unit 2 thus carrying the extra unit to unit 3.

The transfer contacts of the remaining units are wired in a similar manner and a transferring operation may involve any number of them and will be identical to that just explained. All the contacts 143 of each series are connected in parallel to the energizing line and a transferring operation may be initiated on any unit. Furthermore, the closure of the contacts 144 has no effect upon the other contacts 143 of the next lower denominational order and are also closed during the same cycle. In other words, there will be no carrying from an accumulator unit whose accumulating element stands at nine at the end of a cycle unless the accumulating element of the next lower denominational order passes through zero during the same cycle.

The mechanical devices for properly closing the transfer contacts will be explained in connection with Figs. 3, 4, 7 and 8 of the drawings. The contacts 143 and 144 are mounted on a bracket 150 and insulated from each other and the base plate. For the purpose of closing contacts 144 at the "9" position of the accumulating element 131 there is secured to this element a cam 151 (Fig. 7) the projecting end 152 of which, at the "9" position engages one arm 153 of a bell crank the lower arm 154 of which abuts a push rod 155 to bring the contacts 144 closer to each other, but without effecting an electrical contact between the points thereof. Later in the cycle at transfer time an insulating bridge bar 156 correlated with the two pairs of contacts 143 and 144 is shifted by devices to be explained hereinafter, and if the accumulating element is at the "9" position the contact spring shifted by the bar 156 will cause the related contact to engage the contact point carried by the blade which is held in shifted position by the push rod 155.

If the cam 151 passes beyond the "9" position the contacts 144 will not be closed when bar 156 is shifted.

For the purpose of shifting one of the contacts 143 when the accumulating element passes through zero the same cam 151 is employed. When the cam passes a step beyond the position shown in Fig. 7 to the Fig. 8 position, one of the projecting ends will engage a downward extension 157 of one arm of a bell crank 158. The vertical arm 159 of bell crank 158 abuts a related push rod 160 so as to shift the correlated contact blade of contacts 143. As the accumulating element sometimes passes through the zero position it is necessary to hold the blade shifted. To this end a spring urged latch member 161 engages a bent portion 162 of the vertical arm 159. Thereafter, at the proper point in the cycle, bar 156 shifts the correlated blade of contacts 143 to effect a closure of the same.

From the normal position of the parts shown in Fig. 3 it will be observed that the extension 157 of arm 158 is just ahead of the extension of arm 153 so that the cam point 152 engages them in succession to shift contacts 144 at the "9" position and contacts 143 at the "0" position. Cam 151 is of double formation with the projecting cam extensions at a distance of ten units apart.

For the purpose of restoring the bell crank 158, a lobe 163 of a cam element engages the edge 164 of the latch member 161 shifting the same and thus releasing the bell crank. The latter element is shifted to its home position by the inherent resiliency of the spring blade shifted by the rod 160 and is assisted by a coil spring 165 (Figs. 3 and 4).

While contacts 144 or 143 may be so arranged to be immediately closed it is preferred to close them later by the bar 156 to avoid mis-operations in adding occasioned by objectionable back circuits. The setting of these contacts for subsequent closure is, however, under control of the cam 151.

The bar 156 is shifted by the following mechanism operated at the time cam transfer contacts CFI (Fig. 15) close. Rotatable with the gear 112 is a profile cam 166 (Fig. 6) which is adapted to engage a roller 167 carried by one arm of a bell crank 168. The vertical arm 169 (see Fig. 3) of the bell crank, when shifted in turn, shifts an abutting push rod 170 to rock a bail shaped frame 171 carrying the aforesaid insulating cross bar 156. Restoration of the bail 171 and actuating parts is effected by the resiliency of the contact blades and is assisted by a coil spring 172 (Fig. 4).

The energization of the accumulator magnet 126 under control of the transfer contacts as explained in connection with Fig. 15a causes shifting of the yoke 121 to cause engagement of the clutch teeth 117 and 118 and the wheel 131 thereupon rotates an angular distance of one tooth space or point, the clutch being thereafter disengaged by the cam lobe 133 (Fig. 6) abutting the push rod 135 to shift the yoke 121 to re-latched position.

Figure 10:
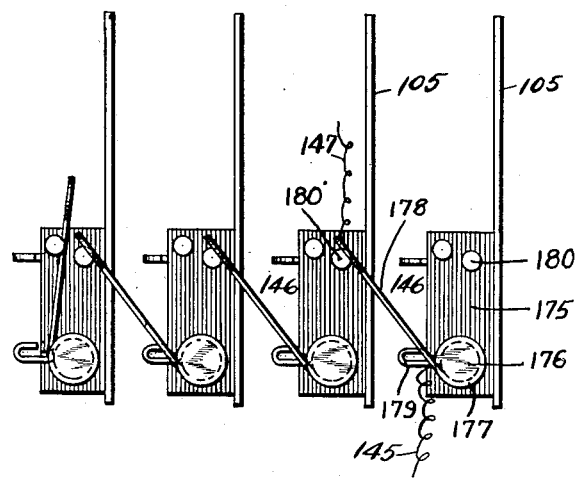
Fig. 10 is an end view of parts of several accumulating units illustrating how transfer crossovers are effected.

There has been referred to in connection with the diagram in Fig. 15a a series of transfer switches 146 which interconnect the series of denominational accumulator units. Actually such devices comprise the embodiment shown in Fig. 10. Mounted at the end of each base plate 105 is an insulating block 175. The block 175 carries a stud 176 coiled around which is a coil spring 177 terminating in a wire extension 178. The desired wiring connections are made such as wire 145 to the looped end 179 of the coil spring and wire 147 to a stud 180. By permitting the wire extension 178 to engage the stud 180 of a unit of higher denominational order a transfer interconnection between adjacent units may be made. By retaining the wire as shown in connection with the left unit illustrated in Fig. 10 the units may be split as desired. The above facilitates interconnections of the successive units and eliminates the necessity of plug board connection and related instrumentalities.

Printing

The printing mechanism (Figs. 1 and 2) is of the rotary drum type substantially similar to that disclosed in the Patents 1,516,079 and 1,750,459. As these and other patents illustrate and describe the details of construction reference to such patents may be had for a more detailed description of construction and operation.

The operation of the printing mechanism will be described herein only generally and only those parts that have an intimate correlation with the present invention. The printing drum 54 carries a plurality of circumferential type 185 (Fig. 2) mounted on pivoted carriers 186. Ordinarily one row is provided for each column of the controlling cards and each row contains a type for printing each character which may be represented by the index points in the card columns.

A locking cam 187 is provided for each type carrier to hold it positively against rotation about its pivot except when it is in printing position. These cams consist of partially cylindrical members or disks 187 each provided with a notch 188. They are rotated in synchronism with the drum by gear trains (not shown) so that each cam makes one revolution for each revolution of the drum so that the notch will release the type carrier for possible printing operations whenever it reaches printing position. Each type carrier has a cam surface 189 concentric with the periphery of the cam disk 187 when the carrier is in normal inoperative position. During that portion of the cycle when the carrier is out of printing position the cylindrical surface of the cam 187 rides under the cam surface 189 and holds the carrier firmly against rotation as shown in connection with certain of the type carriers illustrated in Fig. 2. When a carrier reaches that position in which rocking about its pivot would cause its type to strike against the platen 190 the notch 188 in the locking cam releases the carrier so that it may be rocked about its pivot to cause its type to print.

The printing call mechanism for each row of type is controlled by a printer magnet 191 (Figs. 2 and 15a) having an armature 192 provided with an extension abutting a call rod 193 which, in turn, abuts one arm of a lever 194 and rocks it counterclockwise against the action of a compression spring 195 when the armature is attracted by the magnet. The lever 194 in the absence of a printing operation engages and holds the end of lever 197 biased for clockwise rotation by a compression spring 196. The lever 198 integral with lever 197, as more fully explained and shown in the previously mentioned patents, carries a dog 199 so arranged that when the parts are in normal non-printing operation the dog rests against the tip of lever 200 which carries at its extremity a hook 201 for engaging tail projections 202 on type carriers 186.

The proper printer magnet 191 is energized momentarily by electrical impulses to effect printing. The magnet attracts its armature 192 which through its extension forces call rod 193 to the right rocking lever 194 about its pivot and releasing the lever arm 198. The arm is rocked by its spring so that the dog 199, in being shifted upwardly, rocks the lever 200 and forces the hooked end 201 into the path of the tail projection 202 of the type carrier by which printing is to be effected. During the rotation of the drum the impact causes the carrier to turn about its pivot and force the type against the platen 190.

As more fully explained in the patents referred to, at the termination of a printing operation the parts are automatically restored to the position shown in Fig. 2 in readiness for a subsequent printing operation.

Referring to Fig. 2 it will be noted that several printer magnets 191 have been shown in dotted lines. Each of these controls a row of type in the manner just explained and each is offset from its neighbor normal to the plane of the drawing just sufficiently to permit a direct straight alinement of its call rod and printing control lever.

Listing

Listing or printing of each item represented by a card by the present machine is controlled from the lower analyzing brushes through the listing bar 77. Referring to Fig. 15a of the drawings the first printer magnet 191 to the right is wired to control the listing of items analyzed by the units analyzing brush 288. The listing circuit extends from this analyzing brush through wire 208 to socket 209. Through connections to be later described, a differentially timed electrical impulse sent through a jumper connection 210 to a lower fixed blade is imparted through the movable blade of the switch bar 77, wire 212 to printer magnet 191. This is part of the circuit through which the printer magnet gets its current impulse for controlling listing.

The drum 54 rotates in synchronism with the feed of the record cards past the analyzing brushes so that each type reaches printing position shortly after its corresponding index point position on a record card reaches the analyzing brush. When a brush encounters a perforation a pulse of current flows through the circuit just traced energizing the printer control magnet and setting the operating finger to engage the proper type carrier and cause printing immediately thereafter.

Total printing

Total which in this case is balance printing is controlled by each of the accumulator units through the related pair of contacts 215. The contact points are carried by blades insulated from each other and are also carried by bracket 150 (Fig. 4). These contacts form a break in the total printing circuit which may be closed when required by a cam 216 (Fig. 9) secured to the adder element 131. The cam 216 is equipped with diametrically opposite points 217 which are effective to engage a finger 218 of an irregular shaped member 219 shortly after the "nine" position of the accumulating element is assumed so as to close contacts 215 at the zero position thereof. A finger 220 of the member 219 actuates a push rod 221, which, in turn engages one of the spring blades to close contacts 215.

The push rod 221 is actuated at the zero position of the accumulating element to hold the printing circuit closed at this point for a brief interval after the parts have reach zero position and during this interval a pulse of current is sent through the printing circuit to energize the printer magnet, causing it to select the proper type as explained under "Printing". The accumulating element 131 may be arrested in zero position to reset the accumulating element or it may be permitted to rotate until the original item has been re-entered thereon and then arrested to hold the printed total on the accumulating element. These operations will be explained in detail hereinafter.

The total printing operation is initiated by energizing the accumulator control magnets 126 of all accumulator units from which printing is desired simultaneously and shortly before the nine type on the drum reaches printing position. This causes all the clutches to engage simultaneously rotating the accumulating elements and as each of the latter reaches zero position the printing circuit will be closed as explained above. This arrangement always selects the type for printing which represents the item standing on the accumulating element at the time the clutches engage. For example, if a certain accumulating element registers 7 it must turn through its 8 and 9 positions to reach zero. In the meanwhile the printing drum has successively carried the 9 and 8 type through printing position and the 7 type will be selected as the accumulating element reaches zero.

Total printing with accumulator reset

The accumulator units may be restored to zero, or more strictly speaking, arrested in this position when they effect total printing by causing the clutch elements to be disconnected when the accumulating element is at zero.

Mounted on a stud 222 secured to the base plate is a bell crank having vertical and horizontal arms 223 and 224 respectively. Surrounding the stud is a coil spring 225 effective to shift arm 223 to the left (Fig. 9) when released, the spring also being formed to bias the member 219. In the normal position of the arm 223 (see Fig. 3) it is latched by its lower foot 224 engaging a notch 226 of member 219.

As previously stated all of the accumulator magnets 126 are energized simultaneously effecting the desired clutch connection and turning of the accumulating elements 131 at which time a laterally extending lug 227 of the yoke frame 121 (see Fig. 6) bears directly against a hump 229 (Fig. 9) of the arm 223. When the element 131 passes through zero cam projection 217 rocks the member 219 so by its counterclockwise movement the notch 226 is brought out of engagement with the foot 224. Spring 225 is then immediately effective to shift arm 223 and by its abutment with the lug 227 the clutch yoke 121 will be shifted to disengage the clutch. The element 131 is thus arrested in its zero position and remains there.

Figure 9:
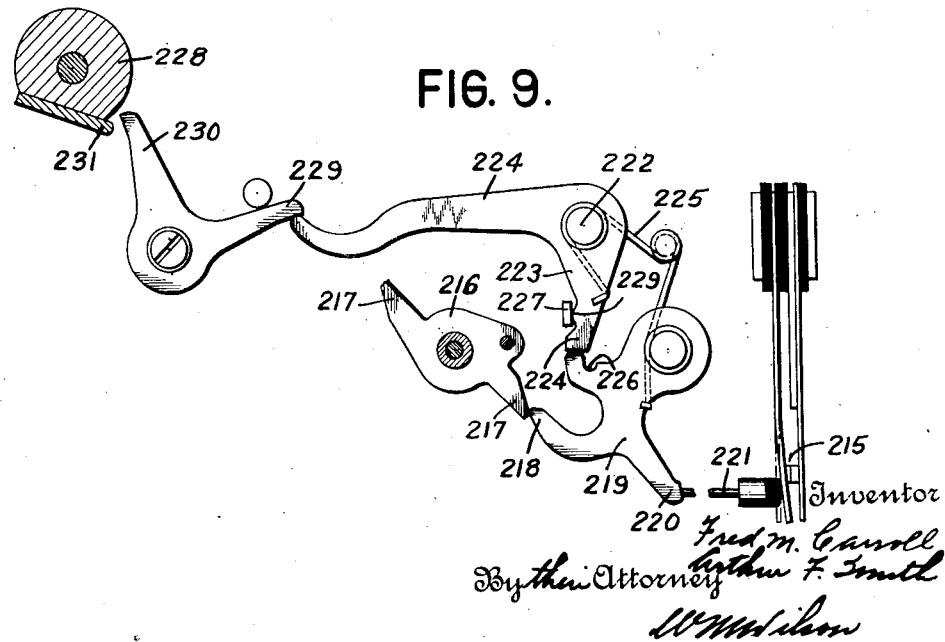
Fig. 9 is a view in side elevation of certain parts employed for closing the total contacts.
Figure 11:
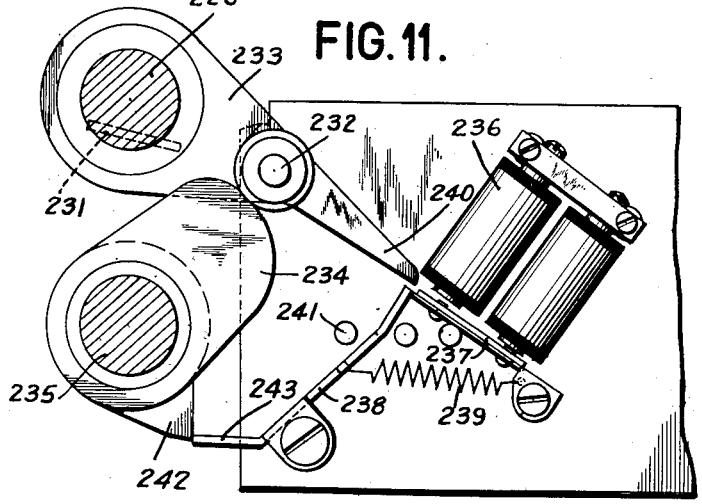
Fig. 11 is a view partly in section showing the mechanism for rocking the printer control shaft.

Resetting operations are selectively placed under control of a rock shaft 228 (Fig. 11). As best shown in Fig. 9 the horizontal arm 224 engages one arm 229 of a bell crank the other arm 230 thereof normally contacts a plate 231 secured to the rock shaft. In the normal position of the parts (see Fig. 3) the plate 231 abuts the lever 230 and such normal position is maintained by virtue of the cooperation of a roller 232 (see Fig. 11) secured to an arm 233 fast to rock shaft 228 with the profile of a cam 234 secured to a shaft 235. This shaft rotates synchronously with the clutch driving element so that upon an initial operation thereof the rotation of cam 234 in a counterclockwise direction enables the shaft 228 to be rocked in one direction by a suitable coil spring (not shown) withdrawing plate 231 out of cooperation with the series of arms 230 of the accumulator units. The positioning of the plate 231 to permit the unlatching of the arms 223 is placed selectively under control of a reset magnet 236 (Fig. 11).

Energization of this magnet causes its armature 237 to be attracted to unlatch a stop plate 238 which is thereupon shifted by its connected spring 239, which also biases the armature 237, to be withdrawn out of cooperation with the projecting end 240 of the arm 233. Thereafter, in the subsequent clockwise rotation of cam 234, the arm 233 will be released to assume a position determined by a fixed stop 241. The plate 231, therefore, is positioned away from the arms 230 to permit the unlatching of the tails 224 and notches 226 (as shown in Fig. 9) resulting in the dis-establishment of the clutch connection when the accumulating elements are at zero.

At the termination of the total printing cycle the cam 234 re-engages the roller 232 to shift the parts to normal shown in Fig. 11. During such operation a cam projection 242 engages a tail 243 of stop plate 238 relatching the armature 237.

The parts remain thus until the reset magnet 236 is again energized. The magnet 236 is under control of the total timer and, as will be now explained, plate 231 is permitted to remain in the normal position permitting the accumulator units to retain their printed totals.

Total printing without accumulator reset

It may be desirable to print totals standing on the accumulating elements and retain the totals on the elements after they have been printed. This is accomplished by turning the elements 131 through an angular distance of ten teeth or points, thereby in effect first restoring them to zero and immediately re-entering the original items. The printing and printing control in this case is substantially similar to that described in the preceding two sections, that is, the accumulator control magnets are all energized simultaneously to effect clutch engagement shortly before the printing drum reaches the 9 position and the total contacts 215 are closed by the member 219 when the accumulator element reaches zero. The printing in this case is done while the element 131 is in motion and passing through zero position and it continues its rotation until it has covered an angular distance of ten teeth or steps, bringing the element 131 back to its original position.

The rock shaft 228 remains substantially in the position shown in Fig. 3 but from Fig. 11 it will be noted that when the cam 234 commences its clockwise rotation the cam contour will leave the roller 232 permitting the finger 240 to engage the top edge of the stop plate 238. This initial movement is concerned with the relatching of the armature by the plate 238 to give the desired clearance and while shaft 228 rocks slightly the plate 231 will still abut the series of levers 230. By thus holding the bell cranks 223—224 it will be observed that the normal latching relation between the tail of arm 224 and notch 226 is maintained while the cam 216 passes through zero, that is, the point 217 will rock the member 219 counterclockwise to close total contacts 215 but since the tail of arm 224 will be held during such operation by the plate 231 through the system of arms 230, 229 and 224, clutch operating yoke 121 will be unaffected and the clutch will be maintained in established or effective position until the element 131 is turned through a distance of ten steps.

The same cam projection 132 (Fig. 6) serves to disengage the clutches for both tabulating and total printing without reset although the accumulating element need move a maximum distance of only nine tooth spaces in the former case and must always move a distance of ten tooth spaces in the latter. This is accounted for by the different timing in the two cases. During tabulating the earliest point in the cycle at which the accumulator magnet impulse can occur is when the analyzing brushes are searching the nine index point position or in other words shortly before the nine type on the drum reaches printing position. During total printing without reset, however, while the accumulator magnet impulse must still be timed before the printing drum reaches the nine position it is timed a full point ahead of the earliest possible tabulating impulse to cause rotation of the accumulating element for ten tooth spaces instead of a maximum of nine.

Subtracting mechanism

The above described features are, in general, common to those set forth in the patent to F. M. Carroll, 1,750,459. An added feature comprises certain features whereby the accumulator units may be employed in subtracting operations.

It will be remembered that straight accumulating operations were performed by establishing a clutch connection to drive an accumulator wheel when a perforation is in registration with the correlated analyzing brush and continuing such relation until the end of the cycle. For example, if a "two" perforation was analyzed the clutch connection established at the "seven" point in the cycle and discontinued at the "9" point would cause an entry of two units to the related accumulator wheel.

Subtracting operations are effected by the complemental process based upon the theory that one number may be subtracted from the other by the addition of the tens complement of the subtrahend. In manual subtracting operations the complements are mentally calculated, that is, the operator selects controlling keys which would enter the tens complement of the number to be subtracted. In record controlled machines, it is desirable that the perforated data represent only the natural number of an amount to be subtracted as in certain tabulating operation it may be desirable to employ such cards for accumulating amounts as well. The conversion of the natural numbers to tens complements is automatically effected by the present machine.

In the event that the perforation represents a value of two it will be recognized that the "nines" complement or seven units must be entered in the accumulator unit to subtract by the complemental process. In the present machine such operations are taken care of for all orders above the units order by energizing all the accumulator control magnets at the beginning of the cycle so that the clutch devices will immediately cause the accumulating element to be turned. Such rotation commences until a perforation is analyzed causing a deenergization of the accumulator control magnet and disestablishment of the clutch device. As this is the point at which the clutch device is rendered effective in ordinary accumulating operations it will be understood that the accumulating element receives a complemental entry.

The structural details whereby the clutch is rendered ineffective at differential times coincident with the perforations reaching the analyzing brushes may best be understood by reference to Figs. 3 and 4.

A subtracting or stop magnet 250 when energized attracts its related armature 251 so as to release a plate 252 secured thereto from the hooked end 253 integral with a bail shaped and pivoted frame 254. Abutting the cross member of the frame 254 is a bent lug 255 of a double arm 256 pivoted at its intermediate portion at 257a. A coil spring 258a tends to turn the double arm 256 in a clockwise direction but is normally prevented from so doing by the latching relationship between elements 252, 253. When such relationship is discontinued as a result of the energization of the magnet 250 the arm 256 is released for movement by spring 258a to shift an arm 257 to the right (Fig. 3). This arm is integral with the bail shaped frame which carries the double arm 256. Articulated to the arm 257 is a link 258 which as shown in Fig. 5 has a hook 259 engaging an extending lug 260 of the clutch operating yoke 121. When the link is drawn to the right by the action of the spring 258a (which is so proportioned that it is able to overcome the spring 125) the clutch connection 117, 118 is disestablished. As such action occurs when a perforation is analyzed, the nines complement of the value of the perforation is entered in the accumulating wheel 131. Relatching of the double arm 256 by the armature is effected by causing the push rod 170 (Fig. 3) to act upon the portion 260 of the arm through a lug 261 of the yoke 171. As the arm 256 is shifted counterclockwise a spring 262 shifts the yoke 254 so that the curved extension 253 reengages the plate 252 of the armature 251. When the arm 256 settles back to its normal position the curved extension 255 will reengage the bail 254. The parts are now in the position shown in Fig. 3 in readiness for a subsequent operation.

The above is a description of the mechanical parts of the apparatus and the operation of the same to perform the intended functions will be rendered more clear by reference to the wiring diagram in Figs. 15, 15a and 15b. Plug connections are shown in connection with the units and tens order it being understood that similar connections are provided for the higher orders.

Addition or subtraction is controlled by the presence of perforations in a special card column, addition being effected when the "8" index point is perforated and complemental subtraction controlled by the presence of the "9" index point. This special card column is analyzed by the upper brush designated 275 which is connected to the plug 276 and by a jumper connection 277 to credit cam contacts 278. The cam is arranged to close at the "8" point in the cycle and through the "8" perforation extend the circuit from the right line 491 through a credit relay magnet 279 and thence by a wire 280 to the other line side 490.

By a similar circuit arrangement the "9" perforation and closure of "9" contacts 281 will cause energization of the debit relay magnet 282.

Thus the perforations may selectively control the energization of debit and credit relay magnets to effect the closure of their respective contacts 285 and 283 (see Fig. 15).

The preferred form of switch bar selecting mechanism is illustrated in Figs. 12, 13 and 14. The credit contacts 283 are normally retained opened by a push bar 365 abutting a bent lug 366 of a swinging lever 368, the lug 366 being latched by a right-angled extension 369 of an armature 370. When the magnet 279 is energized the attraction of armature 370 causes the lever 368 to be unlatched releasing the rod 365 so that the inherent resiliency of one of the contact blades closes the contacts 283. Since contacts 283 are now closed the circuit to the credit switch bar magnet 286 (Fig. 15) will also be closed.

Similarly the debit switch bar controlling contacts 285 are associated with a push rod 371 one end of which abuts a lug 372 of a lever 373 pivoted by a screw 374. Due to the normal latching relationship between the lug 372 and an arm 375 of the armature 376 of the debit magnet 282 contacts 285 are retained opened. The energization of magnet 282 releases the contacts 285 for free closure which results in the closing of the circuit which includes the debit switch bar magnet 306 (Fig. 15).

To restore the contacts 283 and 285 to normal latched position a cam 377 is provided. The cam has a cut-away portion 378 which when in registration with a lug 379 of one arm of a bell crank 380 permits a spring 382 to shift the lower arm to the right and by the abutment of a lug 383 with the rod 384 the lever 368 will be rocked to latched position and similarly contacts 283 opened.

When contacts 285 are unlatched rod 371 is also positioned so that the lug 372 is directly against the lug 383. Now when bell crank 380 is rocked by the spring 382 under control of cam 377 lever 373 will be shifted to latched position and contacts 285 opened.

Assuming that a credit card passes the upper brushes the sensing of an "8" index point will cause credit magnet 279 to be energized and closure of contacts 283. This will result in energization of the credit switch bar magnet 286. As previously stated such action prepares for shifting of the credit switch bar 287 prior to the analyzing of the card perforations. The jack magnets 286 and 306 are adapted to be energized, and energization of one of them during one machine cycle causes a one revolution clutch to engage at a predetermined point in the next cycle. The timing is so arranged that if the magnets are energized during one machine cycle the clutches will engage to move the credit switch bar 287 or debit switch bar 307 during the entering portion of the next machine cycle, in the same manner set forth for the class selection switch bars A and B of the machine disclosed in the Carroll Patent 1,821,089, dated September 1, 1931. As the card with a perforation reaches the lower brushes the analyzing operation ensues. If the units column of a credit card contains an "8" perforation a circuit will be established from the left line side 490 by connections to be later described through the units brush 288, wire 208, jumper 289, credit switch bar contacts 290, wires 291 and 292, jumper 293, through the adding switch bar contacts 294 (now closed) of an adding switch bar 360, wire 296 which leads to the accumulator magnet 126 of the units order, and thence to the right line side 491 by wire 297.

Digressing, the energization of accumulator magnet 126 will effect the driving connection to the units accumulating wheel 131 which will turn at the "8" point until the end of the adding cycle effecting the addition of an eight thereto.

Addition in the tens column is performed similarly by the connections now to be outlined. From the "tens" brush 298, wire 299, jumper 300, credit switch bar contact 301, wire 302, jumper 303, adding bar switch contact 304, wire 305 to the tens accumulator magnet 126. A similar set of connections may be effected for higher orders to effect addition of a number of greater denominational orders.

Subtraction as premised hereinbefore is accomplished by the complemental process. In the event that a number 28 stands on the accumulator and it is required to subtract the amount 14 it will be necessary to add the tens complement or "986" which, by addition, will give "014" as the result. In the present instance the number to be subtracted is punched on the controlling card as a natural or direct number and the addition of the tens complement is automatically effected.

The card with the debit index point "9" in the special column passes the upper brushes and causes energization of magnet 282, closure of debit contacts 285, and energization of debit switch bar magnet 306. This, as premised before, effects the shifting of debit switch bar 307 closing certain contacts now to be described.

The principle of operation requires that the clutch connection to the accumulating wheel be established at the beginning of the cycle and disestablished when the index point perforation encounters the analyzing brush. In the case of subtracting "4" in the example given, such operation would merely effect the addition of 5 units or the nines complement and give a result of a unit short. For this reason, the units magnet 126 is energized a point earlier than the magnets of higher order to effect the addition of the "elusive one".

By wire 280, a circuit is established through a switch 308 when closed, to cam controlled contacts 309. These contacts are timed to close at a point before the usual time that addition is commenced. From contacts 309 a line 310 extends to a blade 311 of the debit switch bar 307 and to a contact blade 312 of the debit switch bar 307 and by the previously mentioned jumper wire 293 a circuit is extended to the units accumulator magnet 126. Addition then ensues until the "4" perforation is reached in the analyzing cycle.

A circuit from the left side of the line is then completed through units brush 288, jumper 289, a jumper 314, debit switch bar contact blade 315 now closed, wires 316 and 317, debit switch bar contact blade 318, now closed; jumper wire 319 to the units stop magnet 250 and thence to the right line side. When stop magnet 250 is energized the clutch connection is dis-established at a time when a "6" has been added to the units wheel which will now stand at "4" being the addition of eight and six.

With the exception that for the higher orders the accumulator magnets 126 are simultaneously energized at a point later, or at the usual time for initiating addition, the operation is substantially the same. These magnets are energized by the line 280 (Fig. 15) which extends through cam contacts 320 to the line 321 (Fig. 15a). This line is connected to the movable switch blades 322 of higher order of the debit switch bar 307, and of these the circuit for the "tens" extends by the previously mentioned jumper 303 to the tens accumulator magnet 126. Addition ensues from the beginning of the cycle to the time the "1" perforation of the tens column is reached. From the tens brush the circuit extends by jumper 300, jumper 323, debit switch bar blade 324, wires 325 and 326, debit switch bar blade 327, jumper 328 and thence by wire 329 to the "tens" stop magnet 250.

It is pointed in columns above the units order where there are no perforations a nine will be entered since addition for those orders commences at the beginning of the cycle and ends at the termination thereof. For the units a turning of ten steps will be effected when no perforation is present. By the provision of the transfer mechanism transfers will be effected across when the result is positive as is well known in the process of subtraction by complemental addition. In the present instance the addition of 014 and 986 will give the result of 014 which is equivalent to 28—14.

*Means for deriving debit and credit balances as positive results*

While such process of subtraction is entirely satisfactory when a positive condition of the accumulator obtains it is not wholly so when a negative condition is encountered. Such negative conditions when the previously described arrangement is used will give the printing of negative results in a complementary form which is very unsatisfactory.

For the purpose of giving either a positive or negative balance as a true or positive number two balance accumulators are provided, the lower one (Fig. 15a) for obtaining a credit balance if it shows a balance as a positive number and the second for a debit balance if it shows a balance as a positive number.

As a credit card passes through the machine the natural number represented thereon is added in the credit balance accumulator and the tens complement thereof is added in the debit balance accumulator. Conversely, if a debit card passes through the machine the natural number represented thereon is added in the debit balance accumulator and the tens complement of the natural number is added in the debit balance accumulator. It has previously been shown how a credit card controls the addition in the credit balance accumulator of the natural number represented thereon and how a debit card causes the addition of the tens complement of the natural number represented thereon to the same balance accumulator. It now remains to be shown how this alternate switching is effected for the supplemental or debit balance accumulator.

The debit balance accumulator and the credit balance accumulator are shown for the purpose of illustration only as having three orders but may be provided with as many orders as is found necessary.

It will be remembered that the credit switch bar 287 is shifted when a natural number is entered in the credit balance accumulator. The connections whereby the switch bar 287 causes the addition of the tens complement to the debit balance accumulator is as follows: For the units, the feeding line 310, closed one point ahead of the normal nine index point, is extended by credit bar switch blade 330, jumper wire 331, adding switch bar blade 332 and line wire 333 to the units adding magnet 126 of the debit balance accumulator. When a perforation is reached the circuit to the units stop magnet 250 of the debit accumulator extends as follows: Units brush 288, jumper 289, switch blade 290, wires 291 and 334, switch blade 335, jumper 336, and wire 337 to the units stop magnet 250 of the debit balance accumulator.

For energizing the tens adding magnet 126 of the debit balance accumulator the line 321 through switch blade 338 and jumper 339 is extended by the adding switch bar blade 340 which is electrically connected to the tens adding magnet 126. The circuit for the tens debit stop magnet 250 extends from the "tens" brush 298, wire 299, jumper 300, credit bar switch blade 301, wire 341, credit switch bar blade 345, jumper 342, and wire 343 which leads to the tens debit balance accumulator stop magnet 250. The above connections will result in the addition of a natural number in the credit balance accumulator and a tens complement in the debit balance accumulator.

There will now be briefly described the manner in which a "debit" natural number is entered in the debit balance accumulator when the card is a "debit" card in which case the debit switch bar 307 is shifted. As a perforation reaches the units brush 288, the circuit extends through this brush, jumper 289, jumper 314, debit bar switch blade 315, wire 316, wire 344, jumper 331, adding bar switch blade 332 and wire 333 to the units debit accumulator adding magnet 126. For the "tens" the circuit extends from the "tens" brush 298, wire 299, jumper 300, jumper 323, debit switch bar blade 324, wire 325, wire 346, jumper wire 339, adding bar switch blade 340 which leads to the "tens" adding magnet 126 of the debit balance accumulator.

The results accomplished by the above arrangements are clearly perceived in Fig. 16. The initial entry is a credit of 9430 represented as a natural number in the credit balance accumulator and as a tens complement in the debit balance accumulator. The next entry consists of the addition of 671 in the credit balance accumulator and the tens complement thereof in the debit balance accumulator. At this point a debit card is passed through the machine and this effects an addition of 10234 as a natural number to the debit balance accumulator and the tens complement thereof to the credit balance accumulator. As 10234 exceeds the sum of the credits 9430 and 671, the credit balance accumulator at this point would be negative and represent the balance as a tens complement but the true number would be exhibited on the debit balance accumulator. As the operation continues for the adding and subtracting of the items listed it will be observed that at the termination thereof, a true credit balance is obtained from the credit balance accumulator and the tens complement of this number is in the debit balance accumulator.

In Fig. 16 there is also shown how the credit and debit items appear printed on a sheet. These are printed at the left in correlated columns as the debit and credit cards follow each other. The selected balance is printed beneath the appropriate column.

*Printing debit and credit balances*

In addition to listing of credit and debit items provision is also made for printing the balance that results in a positive number. Such selection is performed by the presence of "nines" in the result. Referring to the example given the debit balance has resulted in a complementary result which automatically selects the credit balance accumulator for balance printing. This is effected by selectively shifting a credit balance printing switch bar 357 or a debit balance printing switch bar 358.

The highest denominationally ordered element of the debit balance accumulator has fixed thereto a cam 350 (Fig. 15) which closes the contacts 351 at the nine position of this element of the debit balance accumulator and which contacts are in series connection with the credit switch bar magnet 352 which causes the credit switch bar 356 to be shifted. Similarly a cam element 353 will close the contacts 354 in series with the debit switch bar magnet 355 when the highest denominational element of the credit accumulator rests at a "nine" position to cause shifting of the debit switch bar 358. When the magnets are selectively energized either the switch bar 357 or 358 is shifted.

Referring to Figs. 15a and 15b one side of each of the credit accumulator total contacts 215 is wired by line wires 356 to fixed switch blades of the credit switch bar 357. One side of each of the total contacts 215 of the debit accumulator are similarly connected to fixed switch blades of the debit switch bar 358 by line wires 359. The associated fixed blades of the respective switch bars are plugged to the printer magnets 191 in order that they may be placed in circuit connection with either the debit or credit balance accumulator total contacts by the selection caused by the shifting of a particular balance printing switch bar. The same printer magnets employed for item printing may be used which would cause the balance to be printed beneath the last printed item or by the use of a separate set for printing of the balances in adjacent columns.

*General operation*

The complete operation of the machine may be understood from Figs. 15, 15a and 15b which should be placed side by side with Fig. 15b under Fig. 15a and both to the right of Fig. 15 to form a complete circuit diagram. The machine circuits are energized from power lines 490 and 491 between which driving motor 50 is directly connected through a switch 492. Closure of the switch 492 starts the motor, setting the machine into operation but there is no card feed as yet as the card feed clutch magnet 402 is deenergized and the clutch 403 disengaged. Card feed is started by depressing the starter key ST, closing contacts 502, which initiates the operation of either the D or E starter timer depending on the initial position of the cards with respect to the lower analyzing brushes. If there is no card under the lower brushes, the lower card lever 504 will be in the position shown in Fig. 15 closing contacts 505 and opening contacts 506. In this case the timer D will be selected, its starter coil 503a being energized through a circuit extending from line 490 through card feed contacts CF9, closed in the D position, contacts M—1, closed as long as the card feed clutch 403 is disengaged, then serially through timer contacts E7, D7 and F12 to start key contacts 502, thence through contacts 505, starter magnet 503 and wire 514 back to line 491. This starter circuit includes contacts on all the timers and contacts on the card feed clutch and card feed shaft in series. The contacts on the timers are closed when the timers are in normal rest position and broken as soon as the timer starts in operation. The contact M—1 is closed as long as the clutch is disengaged and opened when the clutch engages. Once each cycle this contact is closed, however, so that during this closed interval the card feed cam contact CF9 opens. The conjoint operation of contacts CF9 and M—1 then holds the starter circuits open as long as the card feed clutch is engaged. This series of contacts effectively prevents the energization of any starting timer starting coil while any other timer is in operation or while cards are being fed under the analyzing brushes.

The energization of starter coil 503a starts the D timer and it runs for six cycles. The contact D—2 closes in the first timer cycle and opens in the fifth thus conditioning a card feed clutch magnet circuit for three full cycles. This circuit is closed once each machine cycle by regular cam contact R1 and extends as follows: from line 490 through wires 507 and 508 to contacts D2 thence through wires 509 and 510 to regular cam contacts R1 closed at the proper point in each cycle, and through wire 511 and card clutch magnet 402 and wires 512 and 514 back to the other side of the line 491. The energization of card feed clutch magnet 402 causes engagement of the card feed clutch and the card feed shaft rotates during these three cycles of timer operation.

The lower brushes are energized through a circuit extending from line 490 through cam contacts 519, lower brush lever contacts 520, card feed contacts CF10 and wire 521 to conducting block 522 on which the lower brushes are mounted. The lower brush lever contacts 520 are closed only when cards are under the lower brushes and during this time a pulse of energy will be supplied to the brushes for each index point position by the closure of the contacts 519 by their cooperating dentated cam, this cam being designed to close the circuit after a brush reaches a card perforation and open it before the brush clears it.

The first card feeds to the upper brushes during the second cycle of timer operation and to the lower brushes during the third cycle and the card feed clutch magnet will be energized once for each card cycle ensuring card feed as long as the card group does not change as determined by the group control mechanism. The automatic group control is fully set forth and described in the Carroll Patent 1,750,459.

While the card group is feeding past the upper analyzing brushes the debit and credit selecting perforations are analyzed selecting either magnet 279 or 282 according to the type of card designated. Energization of either magnet selects the debit or credit switch bar 287 or 307 so that the recorded item may be entered in the debit or credit balance accumulator as a natural number and the tens complement thereof into the balance accumulator not receiving the natural number.

The shifting of the listing bar 77 closes the circuit through the card perforations through jumpers 210 and the blades of the switch bar to the printer magnets 191. Listing and accumulating continue automatically as long as cards are fed to the machine. The listing switch bar 77 and adding switch bar 360 are under control of their magnets 361 and 362, respectively. The circuit for these magnets extends from the line wire 490, wire 507, cam contacts R—15, card feed clutch controlled contacts M—11, wire 363, switch magnets 361 and 362 in parallel for simultaneous energization, wire 364 and thence by wire 514 back to the other line side 491. The contacts R—15 determine the time in the previous cycle the listing bar is set for a shifting operation while the continuity of such operation is dependent upon contacts M—11. These contacts close when card feed clutch 403 is effective and open when no cards are being fed, as in balance printing operations, or upon the passing of the last card in the hopper.

The accumulator control magnets which are to be energized according to their true values are coupled with the analyzing circuits through the accumulator switch bar. Either the debit or credit adding magnets are selected for operation by the shifting of the corresponding switch bars 307 and 287. The units magnet 126 of the accumulator selected to receive the tens complement receives its pulse a point earlier than the remaining orders by closure of contacts 309 for the units order at one point earlier than the closure of contacts 320 for the higher orders. The stop magnets 250 of the balance accumulator receiving the tens complement are energized at differential times in accordance with the time the card perforations are sensed.

Balance printing may be automatically instituted at the end of a card group by previously closing the balance printing control switch 531. The first card of a new group arriving under the brushes fails to close the circuit of the auto control circuit as fully explained in Patent 1,750,459 thereby preventing closing of the circuit of the card feed clutch magnet 402. The card feed clutch disengages at the end of the cycle leaving the last card of the group just tabulated under the lower brushes and the first card of the next group under the upper brushes.

The contacts M5 close before the end of the cycle and shortly after this but still before the end of the cycle card feed contacts CF6 close momentarily completing a circuit for the the F timer starting coil 536. This circuit may be traced as follows: From line 490 through contacts CF6 and M5, wire 537 to starting coil 536, thence by wires 512 and 514 to the other side of the line 491. The F timer then starts and continues in operation for six cycles during which the several types of balance printing of which the machine is capable may be carried out.

The first cycle of time operation overlaps the last tabulating cycle and no actual printing operations occur during this cycle although the contacts F8, 11 and 12 close to prepare certain circuits for energization during subsequent cycles. The contacts F11 which closed during the first cycle open during the fifth and prepare a total or balance printing circuit which extends from line 490 through wire 507 and contacts F11 to cam contacts R3. The cam contacts R3 close and open nine times during each machine cycle and their closures are synchronized with the accumulating elements so that each closure corresponds to a possible closing of the total contacts of the accumulators during balance printing or totaling. These contacts cause a properly timed impulse to flow through any total print circuit which is closed by an accumulating wheel and prevents sparking at the accumulator total print contacts. The total print circuit extends from contacts R3 to one side of the total contacts 215. This circuit is extended through the proper printer control magnet under control of the selected accumulator.

The balance accumulator selected for a total taking or balance printing operation is dependent upon whether debit contacts 351 or credit contacts 354 are closed prior to a total taking or balance printing operation. Closure of debit contacts 351 corresponding to a negative condition of the debit accumulator selects the credit switch bar 357 for operation and under converse conditions credit contacts 354 select the debit switch bar 358. Shifting of the desired switch bar couples the total contacts 215 of the selected balance accumulator with the printer magnets to effect the selection of the type for balance printing operations.

The selected debit and credit balance printing switch bar closes during the second cycle of timer operation, the circuit of the selected jack magnet 352 or 355 being prepared by the closure of related contacts 351 or 354 and during the first cycle by the closure of the timer contacts F8 and closed by the regular cam contacts R15 at the beginning of the second cycle. The contacts F8 open during the last part of the second cycle and prevent operation of the selected balance printing switch bar during the third cycle.

The circuit of the selected jack magnet extends as follows: from line 490, wire 507, to cam contacts R15, contacts F8, thence through contacts 351 or 354, the selected jack magnet 352 or 355 and wire 514 back to the line 491. The debit and credit balance accumulator units have been shown in Figs. 15, 15a and 15b as plugged for balance printing with reset. The balance printing is therefore done during the second cycle. At the beginning of each cycle of operation a pulse of energy is supplied to the upper contacts of the total with reset switch bar 500 through a cam contact R2 connected to the contact by a wire 543. The total with reset switch bar 500 being closed during the cycle, a pulse of current will be sent through the blades of the switch bar 500 and by the lower fixed blades and jumper connections 501 plugged to the accumulator magnets 126 of both debit and credit balance accumulators. Both of course, will be reset but one will operate idly as the closure of its total contacts will have no affect upon the printing operations. The clutches of the differential of the accumulator selected for balance printing thereupon engage and when the accumulating element passes zero its total contacts are closed completing the total circuit previously traced to the total print contacts and through selected debit or credit total print switch bar contacts thence by suitable wire jumper connections 511 to the correlated balance printer magnets. The total with reset switch bar 500 is shifted under control of the switch magnet 502. The energizing circuit for the jack magnet 502 may be traced as follows: From line 490 through wire 507, contacts R15, contacts F8, wire 503, switch bar magnet 502 and wire 514 back to line 491. This circuit, it will be noted is essentially the same as the credit and debit switch bar magnets, and the timing therefore is the same.

The accumulating elements of the debit and credit balance accumulators must be arrested in zero position and the total printing control rock bar 231 must be shifted during the total and reset cycle. This is accomplished by energizing the reset magnet 236 shown in Fig. 11. This magnet is energized when a selecting switch 535 (Fig. 15) is closed and is controlled by the cam contact R15 in conjunction with the timer contact F8. The latter closes during the second cycle of timer operation and opens during the third and during the second cycle the closure of contacts R15 energized the reset magnet 236 through the following circuit: line 490, wire 507, contacts R15, contacts F8, switch 535, now closed, reset magnet 236, wire 544, wire 514, to the other side of the line 491. The printing control bar 231 is therefore in the position shown in Fig. 9 causing the accumulator elements of both the debit and credit balance accumulators to be arrested in their zero or home position. At the end of the cycle the printing control bar 231 is rocked back to normal latched position by the action of the cooperating cam 234 (Fig. 11).

When the switch 535 is opened the reset magnet will not be energized and retention of the control bar 231 in such a position that the clutch is kept in effective position while the accumulating elements are passing through their zero positions causes the elements to regain their initial position and hold the previous balance or total. Such an arrangement causes the accumulators to continue their addition and subtraction, a running balance or total being obtained at intermediate points as determined by the action of the group control mechanism, fully illustrated and described in the Carroll Patent 1,750,459, or by the exhaustion of the cards of different groups. The circuit whereby the machine goes into a total taking or balance printing operation by a last card operation consists in cutting out the auto-control circuit by closure of switch 526 to the position shown in Fig. 15 and extending the card feed clutch magnet circuit through the lower brush contacts 566. The machine may then be started as before and the cards will continue to feed until they have all been fed from the magazine or until contacts 566 are opened as when the last card passes by card lever contacts 566 thereby opening them.

The total timer F will be started in operation in this case also by the closure of the contacts M5 on disengagement of the card feed clutch a balance will be taken of the last group.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

What is claimed is as follows:—

1. In a record controlled machine of the class described, in combination, a plurality of totalizers each having a set of elements, co-ordinated operating devices, electrical means controlling a set of magnets to cause the operating devices of one totalizer to be simultaneously effective at the commencement of an adding cycle, electrical means including other magnets for rendering said operating devices ineffective at times coincident with the sensing of the index points of a record card to enter the complement of a number in the elements of said totalizer, electrical means for controlling the energization of a supplemental set of magnets to cause the operating devices of the other totalizer to be effective coincident with the sensing of the index points of the record card to enter a direct number therein, and means for causing the operating devices of the other totalizer to be ineffective at the termination of the entry of the direct number.

2. In a record controlled machine, in combination, a set of denominationally ordered totalizer elements, means including a set of magnets which are energized simultaneously for initiating an operation of said elements to normally effect the entry of "9" in each of the elements of certain orders, means including other magnets energized at times by electrical impulses received coincident with the sensing of index points of a record for stopping the operation of said elements, whereby the complement of a direct number is entered in the totalizer, a supplemental totalizer, operating devices therefor, supplemental magnets, electrical circuits therefor for transmitting electrical impulses to said supplemental magnets at times coincident with the sensing of the index points of the record to cause by the operation of the last named operating devices the initiation of the operation of the supplemental totalizer to enter a direct number therein, and means for terminating the operation of the operating devices for the supplemental totalizer after a direct number has been entered therein.

3. In a record controlled machine, in combination, a totalizer for receiving complements of direct numbers, a plurality of normally ineffective clutches therefor, means including a set of magnets which are energized simultaneously for rendering said plurality of normally ineffective clutches effective to normally enter "9" in each of certain elements of the totalizer, means including another set of magnets for rendering the clutches individually ineffective at times coincident with the sensing of index points of a controlling record, a supplemental totalizer, a plurality of normally ineffective clutches therefor, means including still another set of magnets for rendering the clutches thereof individually effective at times coincident with the sensing of the controlling record to enter a direct number in said supplemental totalizer, and mechanical means for rendering the clutches of the supplemental totalizer ineffective at a fixed time at the termination of the entry of direct number.

4. In a record controlled machine in which for the entry of a direct number or a complement of a number the record is fed with the same numerical index point leading, a totalizer element, a clutch comprising one disc shaped element rotatable with the totalizer element and a companion disc shaped element arranged at the side of the first mentioned element and angularly movable towards and away from the first mentioned element, means whereby the companion element of the clutch is normally disconnected from the first named clutch element, record controlled magnetically actuated means for rendering the disconnecting means ineffective at a fixed time whereby the angular movement of the companion clutch element to engage with the other element causes the initiation of the operation of said totalizer element at a fixed time, means for stopping the clutch engagement at a differential time to thereby enter in the totalizer element a complement of a direct number, said record controlled magnetically actuated means upon the entry of a direct number causing the angular movement of the companion element of the clutch to cause the clutch to be engaged at a differential time, and means for causing the clutch to be disengaged at a fixed time for the entry of the direct number in said totalizer element.

5. In an accounting machine, a pair of accumulating devices, electrical means for analyzing records bearing number representing designations, a pair of electromagnetic devices for each accumulating device, each pair for controlling the operation of the related accumulating device, electrically controlled means for causing one of said electro-magnetic devices to be operative to cause the operation of one of said accumulating devices at a fixed time, means whereby said analyzing means upon encountering a record designation causes the other electro-magnetic device of the device operated at a fixed time to be operative to interrupt the operation of said accumulating device after a differential operation thereof to enter a number according to the designation on the record, and further causes one of the pair of electro-magnetic devices of the other accumulating device to be operative to control the entering of another number in the other accumulating device, and means for terminating the operation of the other accumulating device after the other number has been entered therein.

6. In a record controlled machine, in combination, debit balance totalizer, a credit balance totalizer, record analyzing means, operating devices for each totalizer including two sets of controlling magnets for each totalizer, means for transmitting electrical impulses at a fixed time to cause the energization of one set of magnets for causing by the operating devices the initiation of the operation of one totalizer, means controlled by the analyzing means for transmitting electrical impulses to the other set of magnets of the totalizer being operated to stop its operation, and coincidentally transmitting electrical impulses to one set of magnets of the other totalizer to cause its operating devices to initiate the operation of the other totalizer, and means for causing the operation of the other totalizer to be stopped at another fixed time.

7. In a record controlled machine, in combination, a plurality of totalizers, operating devices therefor, a plurality of sets of magnets for each totalizer for controlling the operating devices, record analyzing means, means controlled by said analyzing means for transmitting differentially timed electrical impulses to a set of magnets for each totalizer, one set of magnets for causing the operating devices when the record index points are sensed to terminate the operation of a selected totalizer from a fixed starting time to enter a complement, and the other set of magnets for causing the operating devices of the other totalizer to initiate the operation of the other totalizer and continue it to another fixed time to enter a direct number, means for rendering the operating devices of the other totalizer ineffective at the termination of the entry of said direct number, means for transmitting electrical impulses to the other magnets of the selected totalizer to initiate the operation thereof at the fixed starting time, and electrical switching means for transmitting electrical impulses to the sets of magnets according to which totalizer is to receive the direct number and which totalizer is to receive the complement.

8. In a record controlled machine having the totalizers constructed and arranged in separate detachable denominationally ordered units, each unit constructed so as to have its entering means and control devices for one totalizer element independent of the entering means and control devices for another totalizer element, means for arranging a plurality of units to provide a debit totalizer and a plurality of similar but independent units to provide a credit totalizer, and record controlled means for entering a direct number in one totalizer and the complement of such number in the other totalizer.

9. A record controlled machine comprising in combination, a pair of balance totalizers, a set of analyzing means, means under control of the analyzing means for entering direct numbers in either of the two totalizers, means operable during the analyzing cycle for entering complements of direct numbers in the other totalizer not receiving the direct number, two sets of printing devices, one for each totalizer and each for printing the balance as a direct number, and means one for each of said totalizers' and controlled thereby for selecting the related printing device when the correlated totalizer exhibits the balance as a direct number.

10. In a machine of the class described, in combination, a totalizer element, an operating means, a clutch comprising normally separated and normally co-axial clutch elements, one of which is driven by said operating means and the other being rotatable with the totalizer element, a record analyzing element, and means controlled by the latter for changing the axis of rotation of one of said elements to incline said element with respect to said other element to engage said other clutch element to operate the totalizer element and enter a number therein.

11. In a machine of the class described, in combination, a totalizer element, an operating means, a clutch comprising normally separated disc shaped clutch elements arranged side by side, one of which is driven by said operating means and the other being rotatable with the totalizer element, a record analyzing element, and means controlled by the latter for causing one of the clutch elements to be shifted into a plane which is at an angle to its normal plane to thereby engage said clutch elements to cause the totalizer element to be operated to enter a number therein.

12. In a machine of the class described, in combination, a totalizer element, a clutch element rotatable therewith, a companion clutch element normally separated from the first named clutch element, a gear attached to the companion clutch element, a constantly rotating gear meshing with the first named gear, a fixed member having a slot through which both gears pass at the position their gear teeth intermesh, and record controlled means for causing the gear attached to the companion clutch element to be moved about the aforesaid position to thereby engage the clutch elements and enter a number in said totalizer element.

FRED M. CARROLL.
ARTHUR F. SMITH.